US012252032B2

(12) United States Patent
Hermann et al.

(10) Patent No.: US 12,252,032 B2
(45) Date of Patent: Mar. 18, 2025

(54) BATTERY CONTROL SYSTEMS

(71) Applicant: QUANTUMSCAPE BATTERY, INC., San Jose, CA (US)

(72) Inventors: Weston Arthur Hermann, San Jose, CA (US); William H. Gardner, San Jose, CA (US)

(73) Assignee: QuantumScape Battery, Inc.

( * ) Notice: Subject to any disclaimer, the term of this patent is extended or adjusted under 35 U.S.C. 154(b) by 0 days.

(21) Appl. No.: 17/448,344

(22) Filed: Sep. 21, 2021

(65) Prior Publication Data

US 2022/0118880 A1    Apr. 21, 2022

Related U.S. Application Data

(63) Continuation of application No. 16/751,156, filed on Jan. 23, 2020, now abandoned, which is a
(Continued)

(51) Int. Cl.
*B60L 58/15*       (2019.01)
*B60L 3/00*        (2019.01)
(Continued)

(52) U.S. Cl.
CPC ............. *B60L 58/15* (2019.02); *B60L 3/0046* (2013.01); *B60L 3/12* (2013.01); *B60L 50/64* (2019.02); *B60L 50/66* (2019.02); *B60L 53/11* (2019.02); *B60L 58/13* (2019.02); *B60L 58/14* (2019.02); *B60L 58/21* (2019.02); *B60L 58/26* (2019.02);
(Continued)

(58) Field of Classification Search
CPC ............... B60L 58/27; H01M 10/0481; H01M 10/0468; H01M 10/441
See application file for complete search history.

(56) References Cited

U.S. PATENT DOCUMENTS 3,895,959 A    7/1975    Dehmelt
3,895,962 A    7/1975    Mead
(Continued)

FOREIGN PATENT DOCUMENTS

WO    WO 2012/120782 A1    9/2012
WO    WO 2015/062235 A1    5/2015

OTHER PUBLICATIONS

Buttol et al., "The Electrochemical Characteristics Of A Polydithienothiophene Electrode In Lithium Cells", Electrochimica Acta, 1986, vol. 31, No. 7, pp. 783-788.
(Continued)

*Primary Examiner* — Nathanael T Zemui
(74) *Attorney, Agent, or Firm* — Squire Patton Boggs (US) LLP

(57) ABSTRACT

Various embodiments herein relate to the design of battery stacks, batteries and battery packs that are able to accommodate volumetric expansion in the battery materials. These designs may be especially useful in connection with batteries having negative electrodes made of lithium metal and/or positive electrodes made of an electrochemically active conversion material. These batteries may expand on the order of 10-40% during cycling. The battery designs disclosed herein include compressible regions that span a wide variety of different designs and implementations.

21 Claims, 14 Drawing Sheets

Related U.S. Application Data continuation of application No. 14/038,771, filed on Sep. 27, 2013, now abandoned.

(60) Provisional application No. 61/707,405, filed on Sep. 28, 2012.

(51) Int. Cl.
| | |
|---|---|
| B60L 3/12 | (2006.01) |
| B60L 50/60 | (2019.01) |
| B60L 50/64 | (2019.01) |
| B60L 53/10 | (2019.01) |
| B60L 58/13 | (2019.01) |
| B60L 58/14 | (2019.01) |
| B60L 58/21 | (2019.01) |
| B60L 58/26 | (2019.01) |
| B60L 58/27 | (2019.01) |
| H01M 10/04 | (2006.01) |
| H01M 10/052 | (2010.01) |
| H01M 10/44 | (2006.01) |
| H02J 7/00 | (2006.01) |
| H02J 7/34 | (2006.01) |

(52) U.S. Cl.
CPC ......... *B60L 58/27* (2019.02); *H01M 10/0481* (2013.01); *H01M 10/441* (2013.01); *H02J 7/00* (2013.01); *H02J 7/0069* (2020.01); *H02J 7/342* (2020.01); *B60L 2240/545* (2013.01); *B60L 2240/547* (2013.01); *B60L 2240/549* (2013.01); *H01M 10/052* (2013.01); *H01M 2220/20* (2013.01); *Y02E 60/10* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | |
|---|---|---|
| 4,146,682 A | 3/1979 | Nakao |
| 5,409,787 A | 4/1995 | Blanyer et al. |
| 5,618,641 A | 4/1997 | Arias |
| 5,648,714 A | 7/1997 | Eryou et al. |
| 5,725,967 A | 3/1998 | Tuttle |
| 5,800,939 A | 9/1998 | Mishina et al. |
| 5,929,597 A | 7/1999 | Pfeifer et al. |
| 6,040,085 A * | 3/2000 | Cheu ............... H01M 10/0413 429/185 |
| 6,087,036 A | 7/2000 | Rouillard et al. |
| 6,366,056 B1 | 4/2002 | Podrazhansky et al. |
| 6,797,018 B2 | 9/2004 | Rouillard et al. |
| 7,936,150 B2 | 5/2011 | Milios |
| 8,187,752 B2 | 5/2012 | Buckley et al. |
| 8,349,485 B2 | 1/2013 | Culver et al. |
| 8,460,819 B2 | 6/2013 | Fredriksson et al. |
| 8,481,204 B2 | 7/2013 | Hama et al. |
| 8,507,125 B2 | 8/2013 | Meschter |
| 9,761,861 B1 | 9/2017 | Holme et al. |
| 2003/0124433 A1 | 7/2003 | Kim et al. |
| 2004/0101759 A1* | 5/2004 | Okumura ............ H01M 10/0525 429/317 |
| 2004/0142233 A1 | 7/2004 | Park et al. |
| 2004/0180263 A1 | 9/2004 | Kase et al. |
| 2004/0234865 A1 | 11/2004 | Sato et al. |
| 2005/0014036 A1 | 1/2005 | Kim |
| 2005/0248313 A1 | 11/2005 | Thorland |
| 2006/0068272 A1* | 3/2006 | Takami ............... H01M 10/052 429/61 |
| 2006/0216612 A1* | 9/2006 | Jambunathan ...... H01M 10/0566 429/50 |
| 2007/0075682 A1 | 4/2007 | Guang et al. |
| 2007/0202400 A1 | 8/2007 | Yoshida et al. |
| 2007/0262746 A1* | 11/2007 | Kang ............... H01M 50/569 901/50 |
| 2008/0113226 A1* | 5/2008 | Dasgupta ............ B60L 58/26 429/61 |
| 2008/0124625 A1 | 5/2008 | Hock et al. |
| 2008/0176135 A1 | 7/2008 | Byun |
| 2008/0254343 A1 | 10/2008 | Kaplin et al. |
| 2009/0087723 A1 | 4/2009 | Inda |
| 2009/0173582 A1 | 7/2009 | Ogg |
| 2009/0226816 A1* | 9/2009 | Yoshida ............ C04B 35/447 264/610 |
| 2010/0035155 A1* | 2/2010 | Okada ............... H01M 10/0562 429/231.95 |
| 2010/0190047 A1* | 7/2010 | West ............... H01M 10/0418 361/434 |
| 2010/0233524 A1 | 9/2010 | Hina et al. |
| 2010/0259219 A1* | 10/2010 | Kurimoto ............ B60W 10/06 320/109 |
| 2011/0052960 A1* | 3/2011 | Kwon ............... H01M 10/0481 429/120 |
| 2011/0104532 A1 | 5/2011 | Buck et al. |
| 2012/0028105 A1* | 2/2012 | Kumar ............... H01M 10/482 429/152 |
| 2012/0043924 A1 | 2/2012 | Sheahan |
| 2012/0183832 A1* | 7/2012 | Culver ............... H01R 43/00 429/120 |
| 2012/0207620 A1* | 8/2012 | Dalum ............... B60L 53/80 903/903 |
| 2012/0295142 A1 | 11/2012 | Yan et al. |
| 2012/0308869 A1 | 12/2012 | Obasih et al. |
| 2012/0323386 A1* | 12/2012 | Ito ............... B60L 53/63 700/291 |
| 2013/0004844 A1 | 1/2013 | Hosoe et al. |
| 2013/0026970 A1 | 1/2013 | Gale et al. |
| 2013/0043843 A1 | 2/2013 | Amiruddin et al. |
| 2013/0071718 A1 | 3/2013 | Cho et al. |
| 2013/0089769 A1 | 4/2013 | Proctor et al. |
| 2013/0143088 A1 | 6/2013 | Cho et al. |
| 2014/0028268 A1 | 1/2014 | Bourgeois et al. |
| 2014/0091748 A1 | 4/2014 | Hermann |
| 2014/0093760 A1 | 4/2014 | Hermann et al. |
| 2014/0170468 A1 | 6/2014 | Sasaoka |
| 2014/0170493 A1 | 6/2014 | Holme et al. |
| 2014/0227568 A1 | 8/2014 | Hermann |
| 2014/0272564 A1 | 9/2014 | Holme et al. |
| 2015/0054460 A1 | 2/2015 | Epstein et al. |
| 2018/0330844 A1* | 11/2018 | Aetukuri ............ H01M 10/058 |
| 2020/0168959 A1 | 5/2020 | Hettrich |

OTHER PUBLICATIONS

Choi et al., "Li-ion batteries from LiFePO$_4$ cathode and anatase/graphene composite anode for stationary energy storage", Electrochemistry Communications 12, 2010, pp. 378-381.

Fey et al., "LiNiVO$_4$: A 4.8 Volt Electrode Material for Lithium Cells", J. Electrochem. Soc., Sep. 1994, vol. 141, No. 9, pp. 2279-2281.

Gu et al. "Lithium-Iron Fluoride Battery with In Situ Surface Protection" Advanced Functional Materials, 2016, DOI:10.1002/adfm.201504848, pp. 1-10.

Heredy et al., "Metal Sulfide Electrodes for Secondary Lithium Batteries", In New Uses of Sulfur; West, J.; Advances in Chemistry; American Chemical Society: Washington, DC, 1975, pp. 203-215.

Larsson et al., "An ab initio study of the Li-ion battery cathode material Li$_2$FeSiO$_4$", Electrochemistry Communications 8, 2006, pp. 797-800.

Linden and Reddy, Handbook of Batteries, 2001, McGraw-Hill, Third Edition.

Wang et al., "Conversion Reaction Mechanisms in Lithium Ion Batteries: Study of the Binary Metal Fluoride Electrodes", Journal of the American Chemical Society, Sep. 6, 2011, vol. 133, pp. 18828-18836.

* cited by examiner

BATTERY CONTROL SYSTEMS

CROSS REFERENCE TO RELATED APPLICATIONS

This application claims benefit of U.S. Provisional Patent Application Ser. No. 61/707,405, filed Sep. 28, 2013, and titled "BATTERY CONTROL SYSTEMS FOR VEHICLES," which is herein incorporated by reference in its entirety and for all purposes.

BACKGROUND

In the recent years, with shortage of fossil-fuel based energy and adverse environmental effects from the consumption of fossil fuel, both public and private sectors have poured valuable resources into clean technologies. An important aspect of clean technologies is energy storage, or simply battery systems. One field in which battery technology has made inroads is electric and hybrid vehicles. However, the battery technology successfully deployed in such vehicles has been limited to certain systems, notably metal hydride and lithium ion batteries. There is a need for systems that can accommodate higher performance battery systems.

SUMMARY

The embodiments herein include batteries and battery packs that are designed to accommodate volumetric expansion in their electrochemically active battery materials. In one aspect of the disclosed embodiments, a battery is provided having (a) a plurality of unit cells arranged as one or more rechargeable battery stacks, each unit cell including (i) a positive electrode layer; (ii) a lithium metal negative electrode layer; (iii) an electrolyte layer positioned between the positive electrode layer and the negative electrode layer; (iv) a positive current collector layer in electrical contact with the positive electrode layer; and (v) a negative current collector layer in electrical contact with the negative electrode layer; (b) one or more compressible structures configured to accommodate expansion of the one or more battery stacks during charge; and (c) a confinement structure about the one or more stacks and the one or more compressible structures.

In various implementations, the one or more compressible structures, taken together, accommodate at least about 10% volumetric expansion in the one or more battery stacks during charge. In certain cases, the volumetric expansion is greater, for example at least about 20% or at least about 30%. In one implementation, the compressible structure includes a single compressible structure positioned proximate the one or more battery stacks, and the confinement structure is a battery can. The one or more compressible structures may also be positioned between at least two of the battery stacks. In some embodiments, the compressible structures may be positioned between adjacent unit cells of the stack. For example, the compressible structures may be positioned between layers of positive current collectors and/or between layers of negative current collectors of adjacent unit cells of the stack. In a further embodiment, at least one of the positive or negative current collector layers is also one of the compressible structures. In this case, the compressible structure may be selected from the group consisting of a carbon nanofoam, an aerogel, and non-woven carbon fiber. The rechargeable battery stacks and the compressible structures may have a compressible/cell ratio between about 0.001-2. In many cases the positive electrodes include an electrochemically active conversion material. In one case the positive electrodes include $FeF_3$.

The compressible structures may include a compressible material having a low compression set, where the resilience properties of the compressible structures are stable at temperatures between about 60-100° C. The compressible structures may be provided in a variety of forms. In some embodiments, the compressible structure is a block or layer. In these or other embodiments, the compressible structure includes at least one plate and at least one compressible member. The plate may be rigid in certain cases, and flexible or semi-flexible in other cases. The plate may include a mechanism for maintaining the compressible member or members in position. For example, the mechanism may include divots or raised members on the plate. In certain implementations, the compressible member is a spring. Many types of springs may be used including a cylindrical compression spring, a conical compression spring, a leaf spring, a secateurs spring, a volute spring, a wave spring, and a spring washer. In other cases, the compressible member is selected from an air spring, a gas spring, and a balloon. The compressible member may also be a block of compressible material. Examples of compressible materials include silicone-based foam, polymer-based foam and metal-based foam. The compressible member and/or compressible structure may be coated in some embodiments. This coating may help ensure that material does not flake, shear, or otherwise come off of the compressible member.

In certain embodiments, the battery stacks may be sealed in one or more flexible pouches. The batteries may further include a rigid can into which the pouch or pouches are inserted. The compressible structures may be designed to achieve different goals. In some cases, the compressible structures are configured to provide a uniform force over a face of the stack of electrochemically active materials. The compressible structures may also be configured to compress the one or more battery stacks anisotropically. One method of implementing the anisotropic compression is to use fiber reinforcement in the compressible structures.

In some implementations, the compressible structures may include a flat plate with shapes punched into the surface, where the shapes are configured to deflect under an applied force from the battery stacks. This flat plate may include metal or polyetherimide, for example. In various cases, a face of the compressible structure may be co-extensive or substantially co-extensive with a face of the battery stacks.

In another aspect of the disclosed embodiments, a battery pack is provided including (a) one or more battery stacks, each sealed in flexible pouches, where each of the one or more battery stacks include one or more unit cells, each having (i) a positive electrode layer, (ii) a lithium metal negative electrode, (iii) an electrolyte layer positioned between the positive electrode layer and the negative electrode layer, (iv) a positive current collector layer in electrical contact with the positive electrode layer, and (v) a negative current collector layer in electrical contact with the negative electrode layer; and (b) one or more compression structures positioned such that the one or more compression structures compress as the one or more battery stacks expand on charge, and such that the one or more compression structure expands as one or more battery stacks decrease in volume on discharge.

In yet another aspect of the disclosed embodiments, a battery pack is provided including (a) one or more battery stacks, each sealed in flexible pouches, where each of the one or more battery stacks includes one or more unit cells, each having (i) a positive electrode layer, (ii) a lithium metal negative electrode layer, (iii) an electrolyte layer positioned between the positive electrode layer and the negative electrode layer, (iv) a positive current collector layer in electrical contact with the positive electrode layer, and (v) a negative current collector layer in electrical contact with the negative electrode layer; (b) a first surface and a second surface positioned on opposite sides of the pouches; and (c) one or more bands substantially surrounding the first surface, where the bands provide an elastic force to maintain the first surface, pouches, and second surface in contact with one another, while permitting a degree of volumetric expansion within the pouches."

These and other features will be described below with reference to the associated drawings.

DETAILED DESCRIPTION

Figure 1:
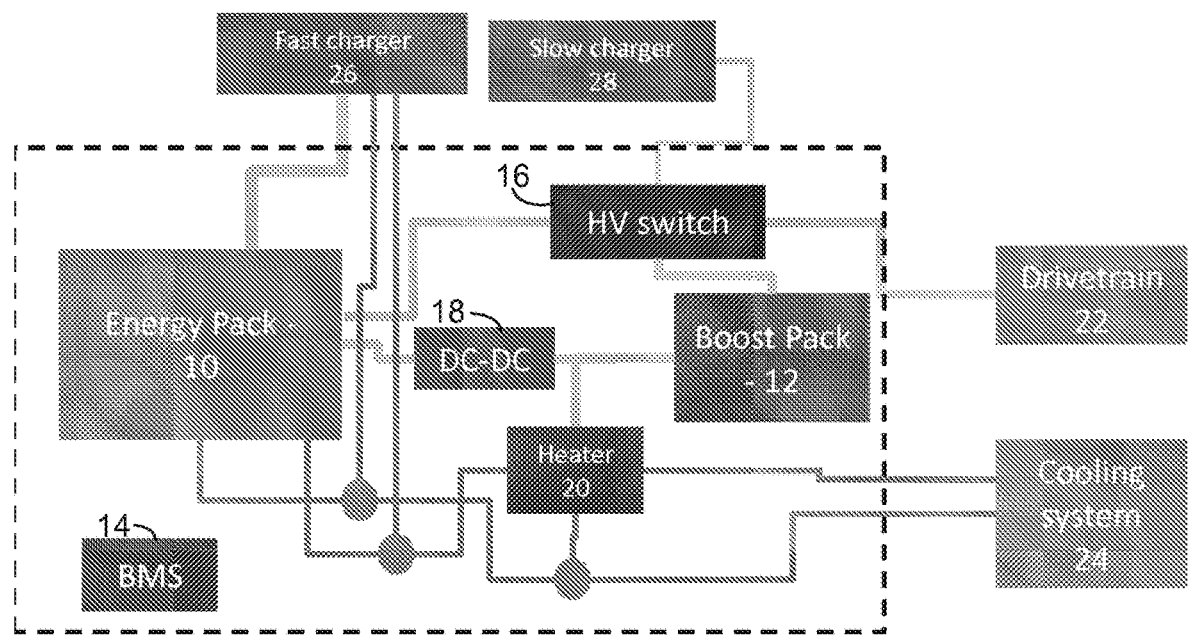
FIG. 1 is a block diagram depicting an architecture for vehicle power systems employing two separate battery packs in accordance with various disclosed embodiments.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph f. In particular, the use of "step of" or "act of" in the Claims herein is not intended to invoke the provisions of 35 U.S.C. 112, Paragraph f.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

The disclosed embodiments concern systems and methods of using batteries having a high capacity positive electrode material that reversibly undergoes electrochemical transition over many cycles of charge and discharge. In some implementations, the material reversibly undergoes a redox reaction at a high rate. There are many examples of suitable materials, which are sometimes referred to herein as "conversion" materials.

Disclosed are systems and algorithms for using batteries in electric vehicles and other products. In various embodiments, the batteries have high operating temperatures; that is, they operate most effectively at temperatures higher than ambient. In one example, the high temperature batteries are solid state lithium-metal fluoride batteries. The batteries are typically provided as packs containing multiple batteries connected in parallel. Some aspects of the disclosure focus on hybrid pack architecture and thermal management. Hybrid pack architectures include at least two battery packs, at least one of which contains the high operating temperature batteries. This pack serves as the primary energy supply for propelling the vehicle most of the time during in normal operation. The other battery pack, referred to herein as a "boost" pack, facilitates vehicle operation when the primary pack is cold. The boost pack comprises batteries that operate effectively at ambient temperatures. The boost pack provides energy for propelling the vehicle after a cold start and provides energy for heating the primary energy pack batteries to a temperature at which they can propel the vehicle.

Certain aspects of the disclosure also concern thermal management systems for controlling the temperature of the batteries in the primary energy pack. Some aspects concern charging systems for charging the primary energy pack and/or the boost pack.

In general, intercalation and/or conversion materials can be used in battery systems described herein. For example, a positive electrode material may be used for intercalation or conversion with lithium. Intercalation materials, which can be prepared at a macro scale or at a nano scale, are commonly used and typically have relatively low energy density (e.g., less than about 800 Wh/kg of active material). Conversion materials, in contrast, can provide much higher energy density (e.g., about 1000-2500 Wh/kg of active material). Battery systems and structures utilizing conversion material are described in U.S. Provisional Patent Application No. 61/778,455, filed Mar. 13, 2013, titled "IRON, FLUORINE, SULFUR COMPOUNDS FOR BATTERY CELL POSITIVE ELECTRODES", and U.S. Provisional Patent Application No. 61/674,961, filed Jul. 24, 2012, and titled "NANOSCALE LITHIUM COMPOUND AND METAL ELECTRODES", and U.S. patent application Ser. No. 13/922,214, filed Jun. 19, 2013, and titled "NANO STRUCTURED MATERIALS FOR ELECTROCHEMICAL CONVERSION REACTIONS", each of which is incorporated by reference herein in its entirety.

In certain embodiments, the conversion material includes an oxidizing species, a reducing cation species, and a metal species. These species are sometimes referred to herein as constituents or components. The oxidizing species is typically a strongly electronegative element, compound, or anion. Examples of oxidizing species anions include halides (fluorides, chlorides, bromides, and iodides), oxides, sulfides, and the like. The reducing cation species is typically an electropositive element or cation such as lithium, sodium, potassium, or magnesium and ions thereof. The metal species is typically less electropositive than the reducing cation species. Transition metals are sometimes used as the metal species. Examples include cobalt, copper, nickel, manganese, and iron. The conversion material may contain two or more oxidizing species, two or more reducing cation species, and/or two or more metal species.

As is understood in the art, batteries and their electrodes undergo electrochemical transitions during discharge and—in the case of secondary or rechargeable batteries—charge. The charge and discharge states of certain conversion materials will now be described.

Discharged state—In the discharged state, the metal species in the positive electrode are generally more reduced than in the charged state. For example, the metal species is an elemental state or a lower oxidation state or positive valence (e.g., +2 rather than +3). Further, during discharge the oxidizing species will unpair from the metal species and pair with the reducing cation species. Still further, during discharge, the reducing cation species tends to move into the positive electrode where it becomes oxidized by pairing with the oxidizing species. Pairing is typically manifest by formation of a chemical bond such as a covalent or ionic bond.

Depending on the implementation, in the discharged state, the conversion material may include an elemental metal material, one or more oxidizing species, and a reducing cation material. As an example, the discharge state may include at least an elemental metal such as iron and a reducing cationhalide such as lithium fluoride. The constituents of the discharged conversion material may be intimately distributed with one other in the discharged material. As described more fully below, these materials may be intermixed or distributed at a scale of about 20 nm or smaller.

It should be understood that a positive electrode of the type described herein may exist in various states of charge. In some cases, a battery is designed or operated so that full discharge is never attained. Thus, if the fully charged conversion material is ferric fluoride for example, the "fully" discharged positive electrode may contain a mixture of elemental iron, lithium fluoride, and some ferric fluoride, and possibly some ferrous fluoride. The use of "discharged" or "discharged state" herein is a relative term, referring only to a state of a conversion material that is more discharged than a charged state of the material. By the same token, the use of "charged" or "charged state" herein refers to a state of the conversion material that is more charged than a corresponding discharge state for the material.

Charged state—In a charged state, the metal species tends to pair with the oxidizing species, often forming a compound. During charging, the oxidizing species tends to unpair from the reducing cation species and pair with the metal species. The reducing cation species tend to move out of the positive electrode and migrate and/or diffuse to the negative electrode where they exist in a more strongly reduced state (e.g., as an element metal such as lithium metal or lithium inserted in a matrix such as carbon or silicon).

As an example, during charge, elemental iron may pair with fluoride anions to form ferric fluoride and/or ferrous fluoride. Concurrently, fluoride anions may unpair from a reducing cation fluoride such as lithium fluoride. The now freed lithium cation migrates and/or diffuses to the positive electrode where it is reduced to elemental lithium or a lithium intercalation material.

"State of charge" (SOC) is used to describe the relative amount of charge that a battery or battery electrode holds at a given time. It is also a measure of the fraction of the available current capacity of the battery or electrode. In other words, SOC is a charge-weighted range between two resting voltages. The units of SOC are percentage points, where 100% indicates that the battery is "fully charged," and 0% indicates that the battery is "fully discharged." The amount of charge between 0-100% SOC decreases over the life of the battery, but 100% SOC is always defined/rated to correspond to a particular voltage value. In order to prevent damage to the battery that may occur if charging continues above the fully charged state, or if discharging continues past the fully discharged state, these fully charged and fully discharged states do not typically correspond to the outermost attainable states of the battery. Instead, the fully charged and fully discharged states of the battery are chosen (i.e., rated) to be within the outermost attainable states, at values that are considered safe for operation and proper battery maintenance. One of ordinary skill in the art would understand that a battery may achieve a SOC that is above 100% or below 0%, though this may carry the risk of battery damage depending on the type of battery used and the conditions of the overcharge or discharge.

Because the batteries capacity may change over time and use, one cannot directly measure the SOC of a battery based on charge passed. There are various methods for indirectly measuring the SOC including measuring the battery voltage and other techniques. In the voltage method, a known discharge curve for a battery is used to translate the battery's open circuit voltage readings into SOC values. Higher voltages correspond to higher SOCs. As the battery discharges, the voltage and SOC decrease together. In some cases SOC readings compensate for temperature and/or rate.

A "unit cell" refers to the smallest unit of layers that functions as a battery, and includes a positive current collector, a positive electrode, an electrolyte, a negative electrode, and a negative current collector. A unit cell is often found in the context of a battery stack.

A "stack" or "battery stack" refers to a collection of unit cells stacked on top of one another, and may or may not include terminals electrically connected with the positive and negative current collectors. The unit cells of the battery stack may be connected in parallel. Alternatively, the cells may be connected in series using, for example, a bipolar arrangement.

A "cell" or "battery cell" refers to an electrochemical device having at least one unit cell and positive and negative terminals for connecting to an outside load and/or to other cells in a battery pack. In certain embodiments, a cell contains a plurality of unit cells, sometimes in the range of about 100-200 unit cells. A cell may include a rigid can or other containment structure surrounding the unit cells, though this is not always the case. In some cases, the containment structure is a flexible pouch.

A "pack" or "battery pack" or "energy pack" refers to a collection of battery cells that are electrically connected to one another.

A "battery" may refer to a battery cell or battery pack, and does not typically refer to a unit cell or a battery stack lacking terminals or a containment structure.

While the following disclosure focuses on electric vehicle applications, it also applies to other applications. Therefore, when the disclosure refers to vehicles, other appropriate end uses can be substituted. Examples of such other end uses include uninterruptible power supplies (UPS), consumer electronics (especially portable electronics), power tools, etc. UPSs provide emergency power to a load in the event that a primary source of power goes down. UPSs are commonly used to ensure near instantaneous protection from loss due to power outages for data centers, telecommunications equipment, medical equipment, and other critical electrical equipment.

Typically, a battery installed for a particular end use is charged and discharged to defined levels at defined rates. These parameters are set to provide safe and effective battery performance for the desired end use. The charge and discharge levels are frequently defined in terms of the battery's state of charge, as described above, which may be monitored by measuring the open circuit potential of the battery's terminals. The parameters may be controlled by circuitry installed in a battery pack and/or the end use apparatus.

Elevated Temperature Batteries

Systems and methods presented herein may be tailored to the characteristics of certain types of elevated temperature batteries. In some examples, the batteries of the primary energy pack have one or more of the characteristics described here. One such characteristic is an all solid state format, in which the batteries have a solid-state electrolyte as well as solid positive and negative electrodes. Manifestations of the all solid phase form of the battery may include one or more of the following: (1) an elevated operating temperature (e.g., over 50° C. or over 80° C.), (2) high temperature stability, (3) comparatively little sensitivity to over and under voltages, (4) rigid and possibly fragile active materials, and (5) high energy density. These characteristics are made in comparison to a conventional liquid electrolyte lithium ion battery.

The energy density of the solid phase battery may be significantly higher than conventional lithium ion batteries. In some cases, the positive electrode materials have an energy density of at least about 2000 Wh/L, or at least about 2750 Wh/L, or at least about 3250 Wh/L when discharged in the voltage range of 1 to 4.5 V vs. a lithium metal electrode at 120° C. at 400 mA/g. In some implementations, aggressive electrode and cell design (e.g., high mass loading, low carbon and porosity content, etc.) the energy density in the active material is sufficient to enable an energy density of over 500 Wh/kg and over 1200 Wh/L at the cell level. The positive electrode active material may have a specific energy of at least about 600 mWh/g at a voltage of at least about 2.9 V relative to lithium, when charged to a voltage of 3.9 V relative to lithium and discharged at a rate of about 400 mA/g a to temperature of about 120° C. In these or other embodiments, the positive electrode active material may have a specific energy of at least about 1000 mWh/g at a voltage of at least about 1 V relative to lithium, with the other parameters as described above.

The use of a solid state electrolyte allows the battery to be exposed to higher voltages than normally permitted with conventional liquid electrolyte lithium ion batteries. While normal operating voltages may be in the neighborhood of 4 volts, some solid state batteries will tolerate significantly higher voltages, e.g., about 5 volts. Most solid electrolytes are more stable at high voltages than most liquid electrolytes. Nevertheless, it is expected that the cell voltage in the battery pack may need to be monitored to ensure that none of the cells experience a voltage outside an operable range. If the voltage increases or drops outside the acceptable range, an interrupt or other mechanism for stopping the charge or discharge may need to be activated. Various mechanisms for interrupting charge or discharge are described elsewhere herein.

In some cases, the batteries of the primary energy pack employ a positive electrode having multiple morphological states. Each such morphological state may be associated with a different phase and may be associated with a different state of charge regime. Among the relevant characteristics of batteries containing an electrode that exhibits phase changes are (1) the possible need for reformatting or reconditioning during the battery cycle life, (2) a macroscopic volume change over the course of the charge-discharge cycle, (3) the susceptibility to degradation of the battery in certain phases, and (4) a pronounced hysteresis in the charge-discharge curves (voltage versus state of charge). As described below, the batteries of the primary energy pack may be subject to reconditioning at various stages of their lives to ensure that their positive electrodes and possibly other components continue to operate at a desired level of performance. Also, as described below, the batteries and the battery packs may be designed to accommodate volumetric changes during cycling.

Another characteristic of certain batteries that may be used in the primary energy pack is a multi-plateaued discharge curve (voltage versus state of charge) for the positive electrode material. Yet another characteristic of certain batteries used in the primary energy pack is a high fluorine content. For example, the positive electrode may contain significant quantities of fluorine.

Examples of batteries possessing some or all of these features are presented in US Provisional Patent Application No. 61/674,961, filed Jul. 24, 2012, and titled "NANOSTRUCTURED MATERIALS FOR ELECTROCHEMICAL CONVERSION REACTIONS"; and U.S. patent application Ser. No. 13/922,214, filed Jun. 19, 2013, and titled "NANO STRUCTURED MATERIALS FOR ELECTROCHEMICAL CONVERSION REACTIONS", which are incorporated herein by reference in their entirety. In general, these batteries are lithium batteries having positive electrodes containing a metal fluoride or other conversion material in their fully charged states. During discharge, lithium ions are inserted into the positive electrode matrix. At some point, the metal fluoride or other conversion material will react to form lithium fluoride and elemental metal. Examples of the metals used to fabricate the positive electrodes include iron, cobalt, copper, manganese, nickel, bismuth, and alloys of any of these materials. In some cases, the discharged positive electrode is comprised of particles having domains of metal, lithium fluoride and possibly other additives. In some cases, the median characteristic dimension (e.g., diameter) of these domains is about 20 nm or less. The particles containing these domains may have a median characteristic dimension in the range of about 100 to 1000 nm. In certain embodiments, the metal is iron or cobalt and the mole ratio of lithium fluoride to metal is between about 2 to 4 in the fully discharged state. In some cases, the conversion materials are provided in a glassy state.

Hybrid System Architecture for Electric Vehicles

FIG. 1 depicts an architecture for vehicle power systems employing two separate battery packs, one deemed a primary energy pack 10 and the other deemed a boost pack 12. This architecture is an example of a hybrid system. The depicted architecture contains certain thermal and electrical features associated with operation of the hybrid system.

Central to this architecture is the use of two separate battery packs. The primary energy pack 10 contains high operating temperature batteries, while the boost pack 12 contains ambient operating temperature batteries. The boost pack 12 generally has less capacity than the primary energy pack 10, but its energy may be delivered at high power. The boost pack 12 may contain a conventional form of battery such as a liquid electrolyte lithium ion battery. Alternatively, the boost pack 12 may contain batteries having a similar chemistry to the batteries of the primary energy pack 10 but with chemistry and architecture optimized to run at lower temperatures.

The primary energy battery pack 10 is used to power the vehicle, i.e., to provide power to the drive train 22. The boost pack 12 performs one or more of the following functions: (1) power the vehicle from a cold start and (2) heat the batteries of the primary energy pack 10 to a temperature at which the batteries operate effectively. Various algorithms may be used to determine which of the two battery packs 10 and 12 is deployed and for which purpose under the various conditions dictated by environmental parameters such as ambient temperature, driving conditions, states of charge of the primary energy pack 10 and the boost pack 12, etc. These algorithms may comprise stored instructions and a processor for executing the instructions. Alternatively, the algorithms may be implemented as dedicated hard coded logic.

In various embodiments, the algorithms are implemented in a battery management system (BMS) 14. The BMS 14 contains the necessary logic (processor and instructions for example) and electrical interfaces to sensors, switches, etc. In some cases, a single BMS 14 controls both the primary energy pack 10 and the boost pack 12. In other cases, separate BMSs 14 may be provided for the two packs 10 and 12, in which case there may be a separate master controller providing high level instructions to the BMSs 14 and coordinating their actions. In another implementation, one of the two BMSs is a "master" and the other is a "slave".

Overall, the hybrid system should be operated in a manner that controls heating and electrical performance. The system should ensure that the primary energy pack 10 operates within a defined temperature window chosen to provide safe and efficient operation of the elevated temperature batteries of the primary energy pack 10. The system should additionally ensure that the states of charge of the batteries in the primary energy pack 10 and the boost pack 12 are maintained at appropriate levels to support long battery life, efficient operation, and acceptable cold start performance.

As explained, the primary energy pack 10 may contain solid phase high energy density batteries such as those employing an iron and fluorine containing positive electrode. The boost pack 12 may contain a more conventional type of battery. Examples of conventional batteries that may be used in a boost pack include, but are not limited to, lithium ion batteries employing conventional cathodes (e.g., lithium iron phosphate), nickel metal hydride batteries, etc.

Typically, the primary energy pack 10 is not suitable for cold start applications. This is because the batteries operate with good performance only at a relatively higher temperature, e.g., about 25° C. to 80° C. The boost pack 12 employs batteries which can operate adequately at a comparatively low temperature (e.g., about −30° C. or warmer) and can be used to propel the vehicle from a cold start, power vehicle accessories, and also deliver energy to heat the primary energy pack 10 so that it can take over for the boost pack 12 in powering the vehicle shortly after the cold start.

The boost pack 12 should operate at ambient temperatures (e.g., about −30 to 60° C.). It should be able to deliver relatively high power (e.g., about 60-200 kW peak and 30-80 kW continuous) and have a modest capacity (e.g., about 1-20 kWh, for example at least about 5 kWh). This implies a discharge (C-rate) of about 5-50 C peak and about 2-20 C continuous. Charge acceptance for regenerative braking is in the range of about 1-10 C. The voltage range of the booster pack 12 may be anywhere from about 150 to 450V and may generally have a more narrow operational voltage range than the primary energy pack 10.

The primary energy pack 10 should have a significantly greater capacity (e.g., about 50-150 kWh, for example 80 kWh) as compared to the boost pack 12. The primary energy pack 10 should be capable of both powering the vehicle and recharging the boost pack 12. Power capability should be about 60 to 300 kW peak and about 30-100 kW continuous. This implies discharge (C-rates) of about 1-6 C peak and about 0.2 to 2 C continuous. Charge acceptance for regenerative braking is in the range of about 0.1 to 1 C. The voltage range of the primary energy pack 10 may be anywhere from about 100 to 450V.

The electrical system of the depicted hybrid architecture includes an HV (high voltage) junction 16 that connects both the boost pack 12 and the primary energy pack 10 to the drive train 22. It switches between these two packs 10 and 12 as appropriate depending upon the state of charge and temperature of the energy pack. It may switch in response to instructions from the battery management system 14. The HV junction 16 may also control delivery of charge from a slow charger 28 to either the boost pack 12 or the primary energy pack 10. The HV junction 16 may also have a low capacity energy storage capability such as a capacitor to ease the transition between sourcing current between the boost pack 12 and primary energy pack 10. The electrical system may also include a fully capable DC-DC power conversion unit 18. In some embodiments, the HV junction 16 and the DC couple 18 described below are the same device.

A DC couple 18 allows the primary energy pack 10 to charge the boost pack 12 under certain circumstances, which are described more fully below. Basically, the boost pack 12 must have sufficient energy to execute a cold start, i.e., a start in which the primary energy pack 10 is too cold to effectively deliver energy to propel the vehicle, including powering vehicle accessories. To ensure that the boost pack 12 has sufficient energy for the next cold start, the primary energy pack 10 may charge it through the DC couple 18. Of course, the primary energy pack 10 should be at a sufficiently high temperature during this charge. The DC couple 18 is capable of accepting voltages in the range of about 100-450 V and outputting power in what may be a more narrow voltage range between about 150 and 450 V. Example ranges may be about 150-350 V input and about 220-300 V output. The power capability of the DC couple 18 should be sufficient to recharge the boost pack 12 in a range of about 20-120 minutes, and/or between about 3-30 kW. The DC couple 18 may be unidirectional and isolated. The DC couple 18 and HV junction 16 can be constructed for custom applications or can be purchased from an auto supply company such as Delphi Corporation, of Troy, Michigan.

In certain embodiments, there may also be a third pack (not shown in FIG. 1) having a use limited to very short periods after "key on" (i.e., after turning the vehicle on) and possibly for powering accessories during an "idle" period described below. This third pack is sometimes referred to as a "starter pack." It gets charged during normal operation through a separate DC couple (also not shown in FIG. 1).

Each of the electrical connections (shown in FIG. 1 as lighter colored, thicker lines) has two terminals, one for each component to which it connects. Each fluid line (shown in FIG. 1 as darker colored, thinner lines) permits fluid flow in only one direction.

Relevant aspects of a thermal management system in this architecture include a heater 20, which may be a resistive heater powered by the boost pack 12, and a fluidic heat transfer system containing fluid carrying conduits and associated pumps and valves. A reservoir 24 may be used to store heat transfer fluid. The fluidic heat transfer system communicates with the heater 20 and the primary energy pack 10. In certain embodiments, it delivers a heat transfer fluid to the heater 20, where the fluid is heated before delivery to the primary energy pack 10. More generally, the fluidic heat transfer system may be configured to deliver hot or cold fluid as necessary to control the temperature of the primary energy pack 10. Stated another way, the primary energy pack 10 can receive or donate thermal energy. In addition to reservoir 24, the fluidic heat transfer system includes appropriate plumbing to transport heated fluid throughout the vehicle. The heat transfer system will include, for example, appropriate valving such as three-way butterfly valves. In certain cases, the reservoir 24 and associated plumbing may be referred to as a cooling system.

Another source of thermal energy that may be used to heat the primary energy pack 10 is current from the pack 10 itself flowing through a relatively low impedance load. This heat source is described in more detail below. This form of heating may be employed during a cold start to reduce the requirements of the boost pack 12 to provide energy for elevating the temperature of the primary energy pack 10. The conditions under which this short circuit is executed are chosen and managed via feedback control administered by the BMS 14 so that the voltage of the primary energy pack series elements does not drop to a level at which the cell degrades. For example, the voltage should be maintained above the potential at which electrochemical dissolution of the anode current collector may take place. Additionally, the current flow should be controlled in a manner to avoid heating the energy pack to a temperature that might damage the cells.

During a cold start and during a charge, thermal energy must be delivered to the primary energy pack 10 to heat it to a temperature that is adequate for high-performance operation. In certain embodiments, the operating temperature of the primary energy pack 10 is maintained between approximately 25° C. to 80° C. After the primary energy pack 10 is in operating mode (i.e., above the minimum operating temperature and providing energy to propel the vehicle), it is no longer necessary to heat the primary energy pack 10. In fact, the pack 10 may generate too much heat, in which case it should be cooled. The fluidic heat transfer system may be employed to provide cooling. If the batteries of the primary energy pack 10 operate at temperatures above the operating range (e.g., temperatures above about 100° C.), they may degrade the primary energy pack 10, for example by degrading the performance of structural or insulating materials such as thermoplastics within the primary energy pack 10.

In certain implementations of this system, an external charger 26, sometimes referred to as a fast charger, is available to provide high power electrical energy to rapidly charge the primary energy pack 10. In the depicted embodiment, fast charger 26 provides not only electrical power to charge the primary energy pack 10, but may also provide heat energy via a heat transfer fluid. Charging of the primary energy pack 10 may be conducted much faster if the battery pack 10 is heated. Therefore, the heat transfer fluid provided from the fast charger 26 may deliver thermal energy to the primary energy pack 10 during charging and/or shortly before charging. In other words, if the primary energy pack 10 is too cool for efficient charging, it may be heated using the heat exchanger provided with the fast charger 26. If, on the other hand, the primary energy pack 10 becomes hot during the charge, the heat exchanger of the fast charger 26 may provide low temperature fluid to cool it. The flow rate and pressure drop of fluid during the fast charge may be higher than during normal operation or during a slow charge, as the off-board fast charge fluid pumps may be more capable than the on-board fluid circulation pumps.

As depicted, the fluidic lines for the fast charger 26 are coupled to the lines associated with the vehicle's dedicated heat transfer system. In some embodiments, the external charging station contains heat transfer fluid for heating or cooling the primary energy pack 10. In some embodiments, the heat transfer fluid stored within the vehicle is simply pumped through the primary energy pack 10 during charging. For example, the fast charger 26 may provide instructions to pump the fluid from reservoir 24 to the primary energy pack 10 during charging. Heater 20 may need to be activated during this procedure.

In certain embodiments, the fast charger 26 is a very high power external device that is arranged to mate with the underside of the vehicle. It may have terminals for delivering high power electrical charge (on the order of megawatts) and an appropriate registration system for aligning to terminals of the primary energy pack 10. When connected to the underside of the vehicle, as opposed to the top or side of the vehicle, the fast charger 26 is less likely to represent a danger to vehicle operators or other persons.

A slow charger 28 may be a conventional charger powered by a conventional electrical outlet in a garage or other suitable location. It may be used to charge the boost pack 12, although it may also be used to charge the primary energy pack 10, albeit relatively slowly. In some examples, the slow charger 28 first charges the boost pack 12, which then heats the primary energy pack 10 to an elevated temperature at which it can be charged by the slow charger.

Systems having hybrid architecture for electric vehicles are further described in U.S. patent application Ser. No. 13/763,636, filed on Feb. 9, 2013, and titled "BATTERY SYSTEM WITH SELECTIVE THERMAL MANAGEMENT," which is herein incorporated by reference in its entirety.

In one aspect of the disclosed embodiments, a battery power system for an electric vehicle is provided, including a primary energy pack having multiple elevated temperature batteries that operate effectively only at a temperature significantly above ambient temperature; a boost pack having multiple ambient temperature batteries that operate efficiently at ambient temperature; and a battery management system configured to discharge the ambient temperature batteries of the boost pack during a cold start to (i) power a drive train of the vehicle, and (ii) heat the elevated temperature batteries of the primary energy pack to a temperature at which they operate effectively.

In certain embodiments the primary energy pack may have a capacity that is at least about twice the capacity of the boost pack. The elevated temperature batteries may include lithium ion batteries having positive electrodes containing a metal fluoride. The elevated temperature batteries may have a lithium metal anode. In some cases the elevated temperature batteries have a solid state electrolyte, while in other cases they may have a liquid electrolyte. The ambient temperature batteries may be lithium batteries with a liquid electrolyte. The lithium batteries may contain a positive electrode containing metal fluoride.

In some implementations, the battery power system also includes a heater for heating the elevated temperature batteries of the primary energy pack. The heater may be electrically connected to the boost pack, for example to permit the boost pack to power the heater. The system may also include a fluidic heat transfer system arranged to supply heat to and remove heat from the batteries of the primary energy pack. In certain cases the system may also include terminals for electrically connecting the batteries of the primary energy pack to a fast external charger. The terminals may be located on the underside of the vehicle, for example. In a particular embodiment, the battery power system further includes a low impedance load adapted for connection to the primary energy pack, where when connected to the low impedance load, the elevated temperature batteries in the primary energy pack discharge through the low impedance load and thereby generate heat to raise the temperature of the elevated temperature batteries. The battery management system may also be configured to perform conditioning on the elevated temperature batteries.

Charging the Boost Pack in Idle Mode

As mentioned, the boost pack is frequently, if not always, responsible for providing power to the drive train when the vehicle starts cold. A cold start is one in which the temperature of the primary energy pack is below its operating temperature. Frequently, the temperature of primary energy pack at the beginning of a cold start is the ambient temperature, which is well below the operating temperature. For some elevated temperature batteries, the operating temperature is, as mentioned, approximately 80° C.

During a cold start, when the key is turned on, the boost pack starts to heat the charged primary energy pack to permit the primary energy pack to discharge effectively and power the drive train. Before the primary energy pack can take over, the boost pack must power the drive train. Each cold start consumes some charge of the boost pack. As an example, each cold start may consume about one-third of the energy stored in the boost pack. When the state of charge of the boost pack drops below a threshold value (e.g., 45%), the boost pack should be recharged prior to initiating another cold start.

In order to ensure that the boost pack can reliably perform its role in cold starting, the hybrid system may utilize a procedure to ensure that the boost pack has sufficient charge before each cold start. Many mechanisms can be employed for this purpose. For example, an external charger may be employed to charge the boost pack while the vehicle is parked near a charger. A slow charger 28 as depicted in FIG. 1 may be employed for this purpose. However, the vehicle will not always be parked at a location accessible to a charger. In certain embodiments, the primary energy pack may recharge the boost pack while the vehicle is driving under the power of the primary energy pack. Frequently, however, the hybrid system is not designed to provide this functionality.

In some cases, a control protocol provides an idle recharge state in which the vehicle is idle but the primary energy pack is engaged to recharge the boost pack. The idle recharge state may be triggered by various events. In one embodiment, it is triggered by the driver turning off the key of the vehicle. More generally, "key off" means that the vehicle is no longer being powered by the battery packs.

In the case where the boost pack state of charge is below the desired threshold (i.e., it is too low for the next key on event), and an external charger is not deployed to charge the boost pack, the vehicle enters the idle state where the primary energy pack is used to charge the boost pack. In some cases, energy from the boost pack may be required to heat the primary energy pack before or during charge of the boost pack. Specifically, to permit the primary energy pack to effectively charge the boost pack, the boost pack may need to utilize some of its remaining charge to first heat the primary energy pack. Thus, before and/or during the charge, the boost pack itself may discharge to a degree in order to drive a heater to heat the primary energy pack.

Figure 2:
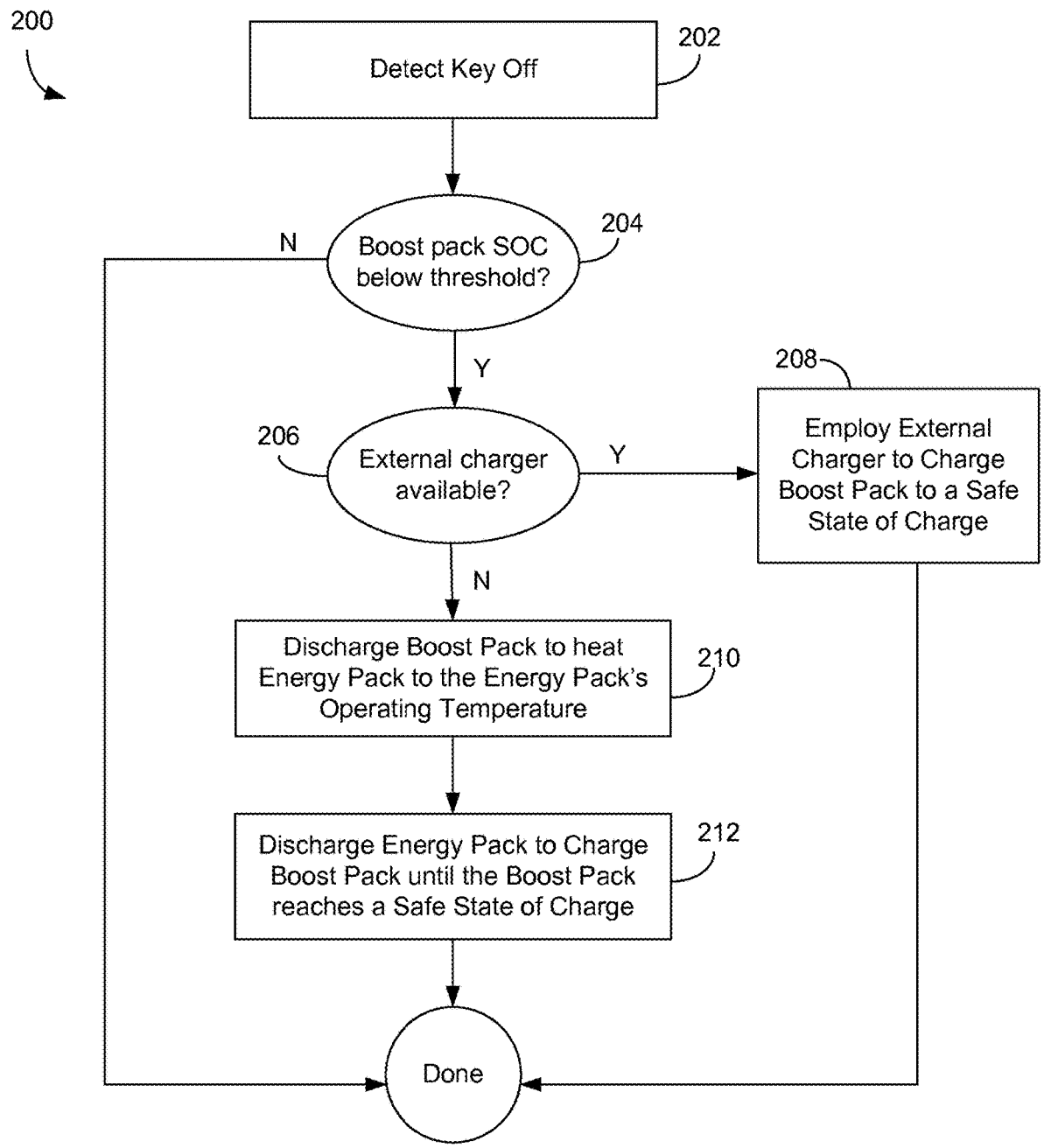
FIG. 2 is a flowchart showing a method of implementing an idle state charge according to certain implementations.

FIG. 2 presents a flow chart for the implementing this idle state charge in accordance with certain embodiments. The idle state charge process 200 begins at 202, when the system detects that the vehicle is in the key off state. At 204 the system detects whether the boost pack state of charge (SOC) is below a threshold value. If the charge in the boost pack is not below the threshold, the boost pack does not need to be charged and the idle state charge process 200 is complete. Otherwise, where the charge in the boost pack is sufficiently low, the process moves on to 206 where the system detects whether there is an external charger available. If an external charger is available for use, the charger is employed to charge the boost pack to a safe SOC at 208, and the idle sate charge process 200 is complete. Otherwise, where there is no external charger available, the process continues at 210. Here, the boost pack is discharged to heat the primary energy pack to its operating temperature. Next, at 212 the primary energy pack is discharged to charge the boost pack until the boost pack reaches a safe SOC, and the process 200 is complete.

In one aspect of the disclosed embodiments, a battery power system for an electric vehicle is provided, including a primary energy pack having multiple elevated temperature batteries that operate effectively only at a temperature significantly above ambient temperature; a boost pack comprising multiple ambient temperature batteries that operate effectively at ambient temperature; and a battery management system configured to recharge the ambient temperature batteries of the boost pack during an idle period prior to a cold start by (i) discharging the ambient temperature batteries of the boost pack to heat the elevated temperature batteries of the primary energy pack to a temperature at which they operate effectively, and (ii) discharging the elevated temperature batteries of the primary energy pack to charge the ambient temperature batteries of the boost pack. In some embodiments, the battery management system is further configured to determine whether the ambient temperature batteries of the boost pack have a state of charge below a threshold value prior to recharging the ambient temperature batteries.

In Situ Conditioning

In certain embodiments, in situ conditioning of the batteries in the primary energy pack is performed to maintain high level performance throughout the life of the batteries in the pack. By in situ, it is meant that the batteries of the primary energy pack remain installed in the vehicle or other end use product during conditioning. It is assumed that the positive electrode, and possibly the negative electrode and/or the electrolyte undergo chemical and/or morphological changes over repeated cycling that can degrade their performance. A purpose of the conditioning is to undo and reverse these chemical and/or morphological changes to ensure continued high performance operation of the batteries in the primary energy pack. For example, one type of degradation that may occur over repeated cycling is capacity fade. This refers to a decrease in the amount of charge a battery is able to hold. Conditioning may be used to restore some or all of the capacity that was originally achievable before capacity fade occurred. Conditioning may also be used in certain embodiments to restore power capability. Because the hysteresis behavior of the cell may increase over time, conditioning may be used to restore functionality.

Regarding conditioning of the positive electrode, it is the believed that metal-anion containing electrochemically active material (e.g., conversion materials such as iron- and fluoride-containing materials) produces small-scale agglomerates of iron (e.g., multiple attached iron domains within a particle) after repeated charge-discharge cycles. The high surface energy of discrete nano-domains promotes this agglomeration, which corresponds to a lower surface energy state. High rate discharge of metal fluoride electrodes may be dependent on maintaining discrete metal domains of small length-scale, e.g., about 10 nm or less such that a low mobility anion and metal species are in close proximity. Therefore, agglomeration is likely detrimental to performance, as it becomes more difficult to effectively charge the positive electrode to a fully fluorinated state in which all of the iron atoms are converted to the fully charged metal-anion compound (e.g., a conversion material, $MA_x$, as a particular example $FeF_3$). This agglomeration may result in capacity fade or other battery degrading processes. Other morphological changes may include the redistribution of species within the cathode.

Additionally, the negative electrode may undergo morphology changes that can benefit from conditioning, even if the conditioning is designed to address changes in the positive electrode. For instance, lateral redistribution of lithium on the negative electrode may occur, causing unequal pressure within a unit cell or cell. Where the thermal profile within a cell is non-uniform during cycling, lithium metal may be selectively plated on hotter regions of the negative electrode as opposed to cooler regions of the negative electrode. This selective plating occurs because hotter areas have lower impedance, resulting in an increased current through the hot spot, and more lithium plating in the hot spot. The increased lithium deposition results in an increased pressure at the hot spot. The local increase in pressure further decreases the local impedance, and causes further plating to occur in this area. This positive feedback loop may lead to redistribution of lithium within the negative electrode.

Conditioning can be performed on a schedule, in response to a particular diagnosis, in response to a conditioning request made by a user, or some combination thereof. Examples of schedules include conditioning after a defined number of charge-discharge cycles, conditioning after a defined number of coulombs have passed (per unit of active material), conditioning after a defined amount of energy (Wh) has passed, conditioning at defined time intervals (e.g., every two months), and conditioning after a defined distance has been travelled by the vehicle. The threshold values for initiating conditioning (e.g., the threshold number of cycles) may be set based on the overall history of the battery since fabrication, and/or based on what has occurred since the most recent conditioning event. Conditioning can also be triggered by certain diagnostic events. Such events may indicate performance degradation or signatures associated with certain morphological characteristics. One example is the detected loss of charge capacity after a typical charge. For example, if the battery can only charge to about 80-95% (or less) of its nominal capacity, this may signal a need for conditioning. In one embodiment, a controller is configured to initiate conditioning when the battery can only reach about 80%, 90%, or 95% of its nominal charge capacity. The charge capacity may be measured by integrating the current used to charge the battery over time. Another example is an increase in over-potential or voltage hysteresis during a typical charge. These or other events may be used to trigger conditioning.

Another possibility is that a user may request that conditioning take place (or not take place). Because conditioning takes a certain amount of time, during which the vehicle is not able to be driven, a user may desire that conditioning occur (or not occur) at specific times. For example, in certain embodiments a control panel may prompt the user before conditioning is performed, in order to determine whether the user wants conditioning to occur at that time. In a particular embodiment, when a controller determines that conditioning should occur, it prompts the user as to whether or not they wish that conditioning take place at the next opportunity (e.g., after the vehicle is turned off and plugged in to a charger or dedicated conditioning apparatus). The prompt may also inform the user as to how long the conditioning process is expected to last. In various embodiments the prompt may occur right away (i.e., when the trigger occurs), or at a later time (e.g., after the vehicle is turned off). The user may then input a response such that conditioning does or does not occur at the next opportunity. This user input may be helpful in ensuring that conditioning doesn't occur at a time that is inconvenient to the user, for example while they are making a relatively short stop where a full conditioning process cannot effectively take place.

As mentioned above, in some embodiments, the triggering event does not immediately cause the conditioning process to occur, but instead causes a conditioning process to be scheduled for a future time. For example, where the trigger occurs while the vehicle is being driven, it would be undesirable for the conditioning to happen immediately. Instead, when the trigger condition is met, a conditioning cycle may be scheduled for the next available conditioning opportunity (e.g., when the car is turned off and plugged in to an appropriate device).

Conditioning typically occurs after a battery has been fabricated and deployed for its end use, not during initial fabrication. Where conditioning happens as a result of a triggering event, the triggering event does not occur during initial fabrication. In other words, the trigger thresholds may be set to values that are not typically seen during fabrication. For example, if the trigger event is the number of cycles and a typical battery will go through 10 cycles during fabrication, the threshold number of cycles may be set at 50 cycles. Because conditioning occurs after battery fabrication, it generally occurs outside of a battery fabrication facility. In some cases, conditioning occurs at a user's residence, work, parking garage, parking lot, etc.

Conditioning to maintain performance of conversion type positive electrodes may be accomplished using various conditioning protocols. In certain conditioning processes, the process substantially de-lithiates the positive electrode and restores its base morphological state (e.g., an amorphous state). By removing lithium (which may be present in the cathode as LiF), the transition metal and anion (e.g., $Fe^{3+}$ and $F^-$) in the positive electrode are encouraged to rejoin one another as $FeF_3$. Recombination of $Fe^{3+}$ and $F^-$ is energetically favored once the lithium is removed. Any iron agglomerates that were present disappear during conditioning as the iron recombines with fluoride ions. During conditioning, the positive electrode goes back to its base amorphous state, in effect resetting the nanostructure of the positive electrode. One way to achieve conditioning of the positive electrode is to apply relatively high voltages over relatively long timeframes.

In certain embodiments the electrode is held at a relatively high potential, often substantially higher than a maximum normal charging voltage usually used to drain a healthy cathode of lithium. For example, normal charging may reach 100% SOC after holding the voltage at about 3.5 or about 3.8 V vs. Li, while the electrochemical stability window of the electrolyte may extend to about 5 V or higher. An example of a conditioning voltage may be about 4 V or 4.5 V (e.g., at least about 4 V). In many cases, the typical operating voltages during a normal charging cycle are about 4 V or lower, for example about 3.8 V or lower. As used in the context of comparing the normal charging voltage and the conditioning voltage, the phrase "substantially higher than" means 0.1 V higher or more. In many cases, the difference between the normal charging voltage and the conditioning voltage is larger, for example at least about 0.3, 0.5, or 0.7 V.

In certain embodiments, the electrode is held at an elevated temperature during conditioning, e.g., between about 80 and 100° C. or for high temperature pack designs up to about 200° C. or higher. In certain embodiments, the electrode is cycled repeatedly over a narrow range of SOC to promote deagglomeration. For example, the cell may be cycled with constant current or power between about 3.5 V and about 3.8 V, or between about 4.0 V and 4.5 V such that the charge and discharge capacity is identical and the SOC before the conditioning is the same as the SOC after conditioning. In some embodiments, there will be zero net charging during the in situ conditioning. Conditioning may be done with time-varying (e.g., AC, pulsed, etc.) current or voltage signals to induce motion over kinetic barriers; this time-varying signal may be superimposed on top of the charging signal or during a high voltage hold step.

Figure 3:
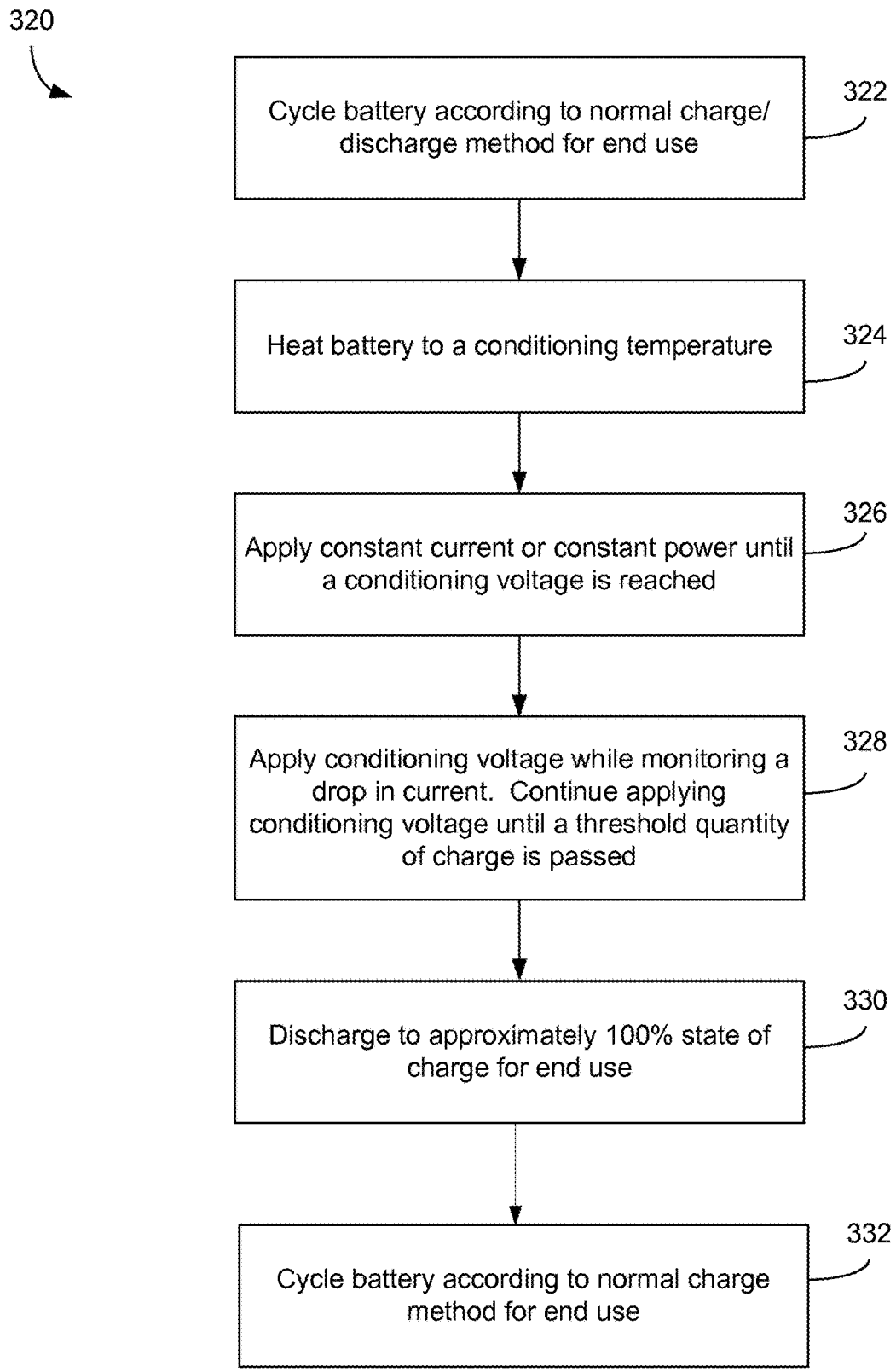
FIG. 3 is a flowchart showing a method of implementing a conditioning method on the positive electrode in accordance with certain embodiments.

FIG. 3 shows a flowchart for an example method that includes conditioning a battery pack. This method may be used in various contexts, and is not limited to vehicular systems, or even systems having battery packs. A method 320 begins at operation 322, where the battery pack is cycled according to a charge-discharge protocol appropriate for normal operation of a particular end use (e.g., powering an electric vehicle, powering a camera, etc.). If the battery is not fully charged prior to conditioning, it may be first charged to its fully charged state. Because the first step of the conditioning process may include charging the battery pack normally, conditioning may be initiated on a battery pack at any state of charge. The method continues at operation 324 where the battery pack is heated to a conditioning temperature. In carrying this out, energy may be delivered from the battery pack to the heater while fluid is circulated to bring the battery pack up to the desired temperature in a uniform manner. In other embodiments, the energy delivered to heat the battery comes from another source, for example an external charger. In some embodiments, the charging operation 322 and heating operation 324 are performed simultaneously. In other embodiments, heating 324 may occur before or after the charging operation 324.

The conditioning temperature may correspond to the highest normal operating temperature (e.g., about 100° C.). In other embodiments, the conditioning temperature is above the highest normal operating temperature. The conditioning temperature is chosen to be at or near the highest temperature to which the battery pack may be reliably raised without damaging the most heat/temperature sensitive component of the battery pack. In other words, the conditioning temperature is at or near the highest temperature at which the battery pack may be processed without damage. In certain embodiments, the conditioning temperature is at least about 100° C., at least about 110° C., or at least about 120° C. In these or other cases, the conditioning temperature may be between about 100-130° C., for example between about 110-120° C. The heating operation 324 may be different from that of a typical charging cycle. In a normal charging cycle, the heater is only used to bring the primary energy pack up to a normal operating temperature, and then heat exchange is used to prevent the pack from reaching a temperature beyond the range of acceptable operating temperatures. Instead, operation 324 is used to bring the battery pack up to a higher temperature, as described above.

Next, at operation 326, a constant or substantially constant current or power is applied to the battery. As used herein, substantially constant current or power means that the current or power does not vary by more than about 20% (in some cases a variation of no more than about 10%, or no more than about 5%) during the substantially constant current or power process. The applied current or power will be chosen for the battery size and type. The constant current or power is applied until a specified conditioning voltage is reached. The conditioning voltage is typically at or above the voltage that corresponds to 100% SOC before conditioning takes place. In one example, 100% SOC as rated is about 4.2 V, and the conditioning voltage is about 4.5 V. In certain embodiments, the conditioning voltage is between about 0.1 and 1 V (e.g., between about 0.1-0.5 V) above the voltage associated with 100% SOC for the end use. The voltage associated with 100% SOC for an end use may also be referred to as the "maximum charge voltage." However, the maximum charge voltage may correspond to a SOC below 100% if the battery is not able to reach 100% SOC during a normal charge. In this case, the "maximum charge voltage" corresponds to the highest level of SOC attainable after a normal charge.

One of ordinary skill in the art would understand that the SOC as rated for a particular application falls within the theoretical limits of battery performance, and that the SOC may go above 100% or below 0% as rated by changing the distribution of lithium between the positive and negative electrodes.

After reaching the conditioning voltage at operation 326, the conditioning voltage continues to be applied and the current is monitored and recorded (operation 328). This operation continues until a threshold battery charge (the maximum conditioning charge) has been delivered (typically measured by the current delivered integrated over time). This battery charge delivered will bring the battery to a SOC at or above 100% or 105%, for example between about 100-110%, or between about 100-105%, or between about 105-110%. The appropriate level of charge may be determined by setting a current decay limit at the target voltage. In another case, the appropriate level of charge may be determined by using a recalibrated charge counting amount. For example, if the battery has experienced a 50% capacity fade, as determined by recent cycling performance, for example, the amount of charge required to bring the battery from 100% to 110% SOC is half of what it would have required originally. A power supply or other controller will typically be able to measure the current device capacity (and hence capacity fade) based on the battery's recent charge/discharge cycles. The relatively high voltage and/or charge delivered during conditioning aggressively removes lithium from the positive electrode to thereby return the electrode to its base state by effectively "overcharging" the battery pack.

Next, the battery is discharged to a safe operating state of charge for its end use, at operation 330. In one example, the battery is discharged to about 100% SOC. This discharge ensures that the battery pack operates within its safe operating parameters. The discharge may be effected in several ways. In one case, the primary energy pack may discharge its extra energy into a boost pack or other ancillary battery after conditioning. In another case, the extra energy is "burned off" through a heater and/or heat exchange system. In another example, the extra energy is returned to an external charger, where possible.

Because some of these possibilities are more attractive than others, the controller may be used to determine how the extra energy is dissipated. For example, the controller may have instructions to preferentially dissipate the energy by (1) recharging the boost pack, if possible, (2) returning the energy to the external charger, if possible, and (3) dissipating the extra energy through a heater/heat exchange as a last resort. In other words, option (2) would only occur if option (1) was unavailable, and option (3) would only occur if both options (1) and (2) were unavailable.

After discharging in operation 330, the battery may be cycled according to normal charge and discharge methods for the particular end use. In certain embodiments, conditioning is performed over a period of about 12 hours or less, or about 6 hours or less, or about 3 hours or less. The method 320 may also be performed on a single battery cell, rather than on a battery pack.

Figure 4:
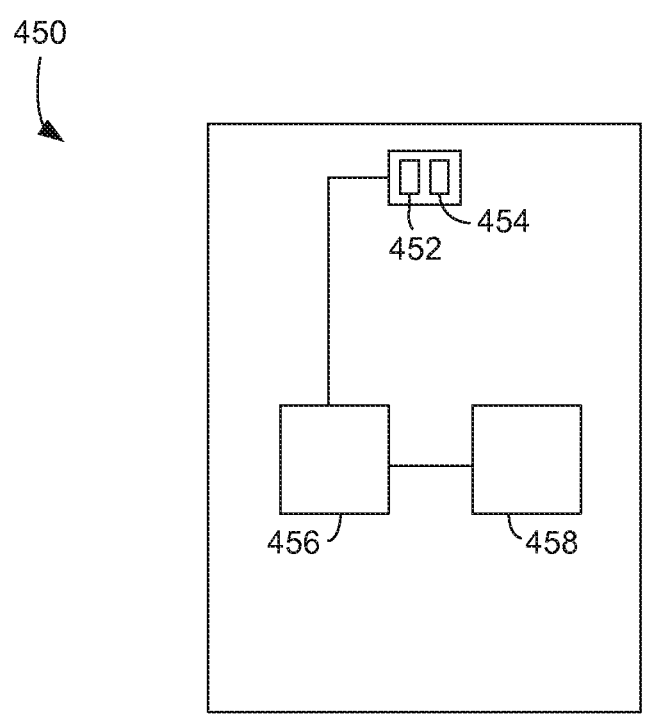
FIG. 4 is a block diagram showing one embodiment of a conditioning apparatus.

FIG. 4 provides a block diagram of a conditioning apparatus 450. The conditioning apparatus 450 includes positive and negative electrical contacts 452 and 454, respectively, for electrically connecting to terminals of the battery to be conditioned. A power supply 456 is coupled to the contacts 452 and 454, and is configured to deliver current, voltage, and/or power to the battery during conditioning. In various embodiments, the conditioning apparatus 450 may be capable of connecting with the electrical power grid or a generator. In these or other embodiments, the conditioning apparatus 450 may be capable of utilizing its own batteries as part of the power supply. In either case, the conditioning apparatus may be portable. In many embodiments, however, the conditioning apparatus may be permanently or semi-permanently installed. A controller 458 may be used to control the current, voltage, and/or power delivered by the power supply 456 to the contacts 452 and 454. In some embodiments, the power supply 456 and controller 458 are the same element. The power supply 456 and/or controller 458 may be programmed to perform any of the methods disclosed herein. For example, the controller 458 may be programmed to perform method 320 of FIG. 3, with or without any of the modifications or specific details described herein. In many embodiments, a conditioning apparatus may also function as a charger.

Conditioning is substantially different from battery formation or other treatment associated with conventional battery systems such as lithium ion batteries. With conventional batteries, the positive and negative electrodes can only accept a certain amount of charge in the form of lithium ions. Beyond this point, the crystal lattice of the negative and/or positive electrode begins to destabilize, leading to electrode damage and battery failure. Further, when a conventional lithium-ion battery is overcharged, it tends to release oxygen from decomposition of liquid electrolyte. This gas release, coupled with flammable solvents in the electrolyte, can lead to the battery igniting. Thus, it is extremely unwise to overcharge a conventional liquid electrolyte containing lithium-ion battery. Therefore many commercial lithium ion batteries include mechanisms to prevent such overcharging. However, where the batteries being conditioned include a lithium metal negative electrode (as opposed to a conventional lithium ion negative electrode), a virtually unlimited amount of lithium may be driven into the negative electrode during a charging process. Often, such batteries have a solid electrolyte, further reducing the safety hazards associated with overcharging.

Stated another way, the battery damage that may occur if the SOC strays above 100% is substantially more likely to occur in conventional lithium ion batteries than with the conversion material batteries used in many of the embodiments herein. When a conventional lithium ion battery is charged, lithium ions are incorporated into the anode. However, the anode is only capable of accepting a certain amount of lithium ions. When the anode has reached its lithium ion capacity, additional charging (with the corresponding additional lithium delivery to the anode) may cause significant damage to the anode. In contrast, where a battery includes a positive electrode having a conversion material and a negative electrode that is elemental metal, e.g., a metallic lithium anode, there is no chemistry-dependent upper limit to the amount of lithium that the anode may accept. Thus, a battery of this type may be more safely "overcharged" (i.e., charged beyond 100% SOC) as compared to a conventional lithium ion battery.

Further, high temperature batteries of the types described herein may have structures that are more likely to require conditioning compared to conventional batteries. The positive electrodes of the high temperature batteries are often made of a conversion material, as opposed to an insertion material as used in conventional lithium ion batteries. The conversion material goes through substantial changes as the battery charges and discharges. In particular, covalent bonds are broken and reformed during each charge-discharge cycle. This repeated bond breakage and formation may make occasional battery conditioning more necessary for extending battery life than with conventional lithium ion batteries that do not experience such bonding and debonding events.

Conditioning may also be employed to improve the performance of the negative electrode and/or electrolyte. Methods for conditioning the negative electrode are further described in U.S. Provisional Patent Application No. 61/839,339 filed Jun. 25, 2013, and titled "PULSE PLATING OF LITHIUM MATERIAL IN ELECTROCHEMICAL DEVICES," which is herein incorporated by reference in its entirety. Over the life of the solid state battery, the distribution of lithium on the anode may become uneven. In certain embodiments, the negative electrode is conditioned in a manner that removes essentially all the lithium and replaces it by discharging the cathode electrode to near or just below zero volts vs. lithium and then slowly recharging it. The recharging may be accomplished using a constant-current charging profile, a pulsed charge profile, or an alternating pulsed charge and discharge profile with a net charge capacity such as two charge pulses and one discharge pulse and/or longer charge pulses than discharge pulses. During the conditioning, the lithium is redistributed within the cathode. This process may be encouraged by increasing the temperature of the cells. This process effectively reforms the entire negative electrode to, in the case of a lithium metal anode, provide a fresh and even distribution of lithium metal.

Conditioning might be performed in a manner that improves the lithium ion mobility in the electrolyte. Solid state electrolytes containing structural lithium species may develop a potential vs. lithium if the structure changes and is no longer stoichiometric. The conditioning algorithm may serve to deplete or replace lithium to restore the original stoichiometry.

In some implementations, the conditioning is performed during external charging of the primary energy pack. In some embodiments, the boost pack assists with the charge and discharge by shuttling energy back and forth, particularly in cases where the external charger cannot accept charge as a load.

In some embodiments, provisions for thermal management of the battery during conditioning are made. These provisions may include, for example, a heat removal system such as the fluidic heat exchange system described above in relation to FIG. 1.

While much of the discussion above focuses on conditioning that occurs in situ, the methods may also be practiced on batteries ex situ. In other words, conditioning may also be performed on batteries that are not installed in an end use device. In this case, the conditioning apparatus may be especially adapted to connect with individual batteries or battery packs. In certain embodiments, the conditioning apparatus may be adapted to hold or otherwise support the battery or battery pack during conditioning.

Heating the Energy Pack by Discharge through a Low Impedance Load

As mentioned, the batteries of the primary energy pack may be discharged through a low impedance load to raise their temperature. In some embodiments, the temperature is raised to a point where the primary energy pack can power the vehicle. This heating mechanism may be executed during a cold start while the boost pack powers the vehicle. This heating mechanism may also be employed to raise the temperature of the primary energy pack batteries in preparation for their own charging by an external charger. Still further, the mechanism may be employed to heat the batteries in preparation for charging the batteries of the boost pack.

As explained above, it is often desirable and sometimes necessary to heat the primary energy pack before it is discharged in normal operation. In particular, effective use of the primary energy pack for vehicle propulsion may require that the pack be heated to an operating temperature above the ambient.

As mentioned, the primary energy pack batteries can also be heated by a heater powered by the boost pack. See heater 20 of FIG. 1. The choice of heating mechanisms can be determined by the BMS using one or more criteria such as whether the batteries of the energy pack are fully or partially charged and whether it is necessary to heat the cells during normal vehicle operation. Depending on the states of charge of the energy and boost packs, the BMS could decide whether to heat the primary energy pack using current flowing from the primary energy or boost packs.

In some implementations, it may be appropriate to use a short circuit through the low impedance mechanism even when the batteries of the primary energy pack are fully discharged (dead). The cells will still have an open circuit potential and may provide some current that will be effective only in heating the cells. A battery pack using normal ambient batteries could not do this because it could not tolerate the resulting low voltages. However, the open circuit potential of a fully discharged positive electrode in some elevated temperature batteries is sufficiently distant from potentials at which damage such as dissolution of the current collector would occur. For example, fully discharged lithium ion batteries having positive electrode materials such as metal—lithium fluoride may be discharged through a low impedance load without the low voltage problems encountered by conventional ambient temperature batteries.

The disclosed short circuit discharge mechanism may be conveniently executed using any of various simple mechanisms. Typically, the system will include a switch to shunt current from the batteries to the low impedance load. A connector may be employed to discharge some or all of the batteries in the primary energy pack through the load. The low impedance mechanism may include switching behavior using components such as IGBT (insulated-gate bipolar transistor) solid state switches to modulate the current draw from the energy pack.

Various constraints may be placed on the self short circuit low impedance heating procedure. An algorithm may be defined to control the temperature of the primary energy pack and/or the duration of the self short circuit in order to avoid damage to the pack or other components and to ensure optimal performance. Short-circuit conditions may be controlled by various mechanisms in the load and associated control system. For example, the current level and/or impedance of the load may be independently controlled over the course of the self discharge and heating. Further, the temperature may be monitored to provide feedback to a controller to allow the controller to make decisions on how much current or impedance to permit. The voltage of each series element in the battery pack may be monitored as part of the feedback loop to modulate the self short circuit load. The voltage of each series element should remain balanced, or within a certain allowable range. As the cells warm, their internal impedances may diverge, possibly leading to negative voltages in the remaining high impedance cells if the feedback control loop is not in place.

The current will flow through the low impedance load until it heats the cells to a temperature at which they can charge or discharge effectively. At that point, the current will cease flowing. If the current was permitted to continue to flow, there could be a dangerous positive feedback situation.

Since the internal impedance of the cells, and hence their loaded voltage at a given pack current, may vary sensitively with temperature, a method of thermally balancing the cells involved in the internal self short circuit may be desired. One embodiment employs a circulating fluid in good thermal communication with the cells involved.

The impedance of such load may be variable or constant over the course of the circuit discharge. Therefore, in certain cases, the load is a variable impedance load.

In a hybrid pack configuration, the load may be charging the "boost" pack or assisting with powering the vehicle. If the primary energy pack is cold, the majority of the discharge energy may be deposited within the primary energy pack as heat.

The heating mechanism may be triggered prior to the key on. It may be triggered by a remote signal, for example, a wireless signal sent by the driver to the car, an automatic communication of a given proximity sensed in communication between the car and a GPS near the driver (on a key fob or smartphone or other device).

Typically, the low impedance discharge is limited to prevent a situation where all negative electrode material is stripped from the negative electrode current collector. There may be a specific initial plating formation cycle (for example, pulsed) that would need to be executed if all the lithium is removed. Otherwise the fresh plating may nucleate unevenly.

In some cases, a large negative voltage may result when discharging cold or unresponsive devices. This can result because some cells might warm up more quickly and have higher fully loaded voltages. For example, if the overall loaded pack voltage is 30 V and there are 50 series elements out of 100 with 1 V each, the remaining 50 series elements will total −20 V. In some cases, the impedance is an exponential or other non-linear function of temperature. To address this issue, the primary energy pack may be designed with a thermal redistribution system which circulates heat around and keeps all cells at approximately the same temperature.

In certain embodiments a fluid heater is employed to dump power from the primary energy pack. For example, with a 10 kW fluid heater, the primary energy pack could discharge through it until it reached a point above 10% efficiency, at which time a peak of 90 kW would be dissipated through cell internal resistance to heat the pack.

Cell Design for Accommodating Volumetric Changes during Cell Cycling

Figure 5A:
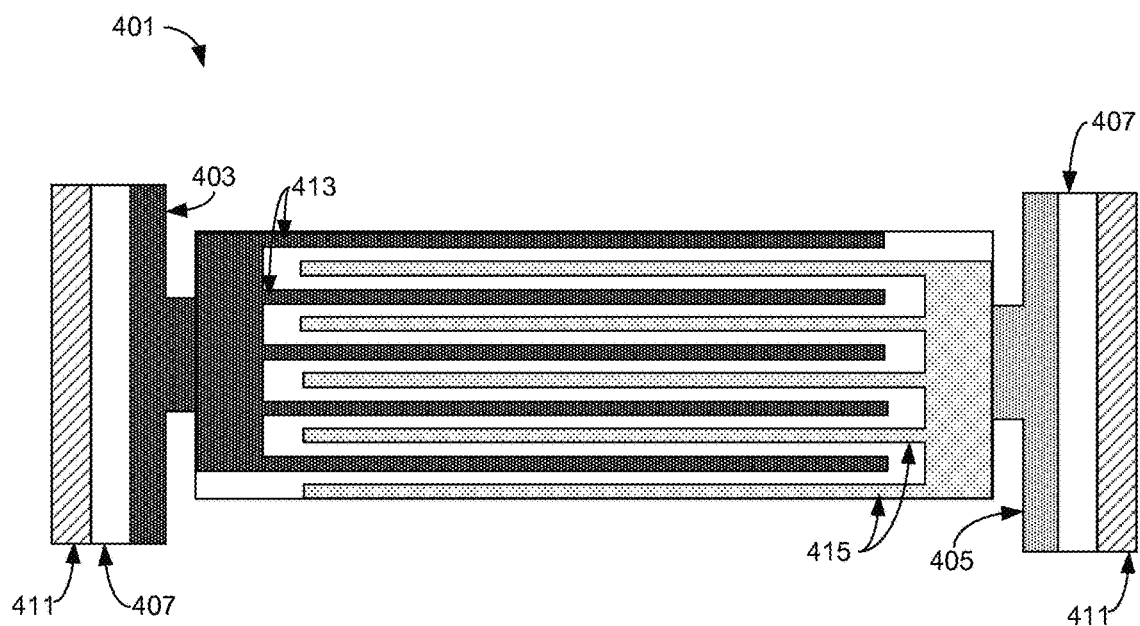
FIG. 5A illustrates a power supply design according to various embodiments.

FIG. 5A illustrates a power supply design in which cell terminals 403 and 405 and current collectors 413 and 415 of a battery 401 are arranged to provide efficient electrical and thermal energy transport while providing good mechanical strength. The current collectors 413 and 415 are arranged in parallel and serve as efficient heat conduits into the cell interior. In certain embodiments, some or all cells are interdigitated and connected in parallel. A mechanically strong point of the stack is where all these current collectors 413 and 415 are connected to one another. The connection may form a relatively large block on each side of the stack, as shown in FIG. 5A. The block serves as an electrical terminal for the battery stack. In this design, heat and electricity are extracted at the same point, the point where the cells are connected in parallel.

In the depicted design, the current collectors 413 and 415 are arranged in an orientation that is substantially orthogonal to that of terminals 403 and 405 in the battery pack. In other words, the longer direction of the terminals 403 and 405 is perpendicular or substantially perpendicular to the lengthwise direction of the current collectors 413 and 415. This perpendicular orientation is depicted in FIG. 5A, where a battery 401 has positive and negative current collectors 413 and 415 arranged in a first direction, and positive and negative terminals 403 and 405 are arranged in a second direction substantially perpendicular to the first direction. Multiple parallel current collectors 413 or 415 are electrically connected with a single terminal 403 or 405, respectively. In the depicted design, the battery cells make up a bi-polar stack in which the negative electrodes of two adjacent cells share a negative current collector 415 and the positive electrodes of two adjacent cells likewise share a positive current collector 413.

The positive and negative terminals 403 and 405 are provided in close proximity to a cooling element such as a water filled conduit 411. As depicted in FIG. 5A, an electrically insulating layer 407 is interposed between the outer surfaces of the negative terminal 405 and a liquid cooling element 411, and likewise between the outer surfaces of the positive terminal 403 and another liquid cooling element 411. In certain embodiments, the electrical insulator is a relatively good thermal conductor such as a ceramic-filled silicone rubber with between about 0.3 to 1 W/mK thermal conductivity with a thickness between about 0.3 to 2 mm. The heat conductive electrical insulator layer 407 should be sufficiently thick to help avoid introduction of electrical current to the water filled cooling element 411 but sufficiently thin to ensure good thermal conductance.

As noted, the stack terminals 403 and 405 have a longer dimension that is oriented in a direction that is substantially perpendicular to the direction of the current collectors. Further, the shorter dimension of the terminal (i.e., the left-to-right thickness of terminals 403 and 405 shown in FIG. 5A) is in substantially the same direction as a current collector. The relatively small dimension is used to minimize thermal and electrical resistance. In some embodiments, the shorter dimension of one or more terminals is between about 1-3 mm thick. Certain benefits are enabled by arranging the current collectors 413 and 415 orthogonally to the terminals 403 and 405.

The current collectors of a given polarity may join to form a current bus that runs the entire length of the active portion of the cell inside the cell packaging. This bus may be one and the same as the terminal 403 or 405 or may be attached (for example, welded) to the terminal 403 or 405 after the bus and active portion of the cell are installed in the package.

In the depicted embodiment, the current collectors 413 and 415 provide triple use paths—the thermal, mechanical (strain), and electrical pathways are all the same. The current collectors 413 and 415 may be relatively thin, e.g., 100s of nanometers to 10s of micrometers thick. The thin cells may enable fast charging and discharging (e.g., about 10 C or greater).

In one aspect of the disclosed embodiments, a battery stack is provided, including a plurality of battery unit cells, each having a positive current collector and a negative current collector, where the positive and negative current collectors of the battery stack are substantially parallel in orientation; a positive terminal connecting the positive current collectors in parallel and optionally having a long dimension that is oriented in a direction that is substantially perpendicular to the direction of the current collectors; a negative terminal connecting the negative current collectors in parallel and optionally having a long dimension that is oriented in a direction that is substantially perpendicular to the direction of the current collectors; and a cooling mechanism proximate the positive and negative terminals.

In certain embodiments, the cooling mechanism includes a fluid. In these or other embodiments, the cooling mechanism may not be necessary to conduct heat from portions of the battery stack other than the positive and negative terminals. The shorter dimension of the terminal may be in substantially the same direction as a current collector, and this shorter dimension may be relatively small to minimize thermal and electrical resistance. Certain implementations may utilize battery unit cells that are arranged in a bi-polar electrical configuration in the battery stack. Alternatively or in addition, the battery stack may also include void spaces and/or compressible regions disposed between the individual unit cells of the battery stack.

Figure 5B:
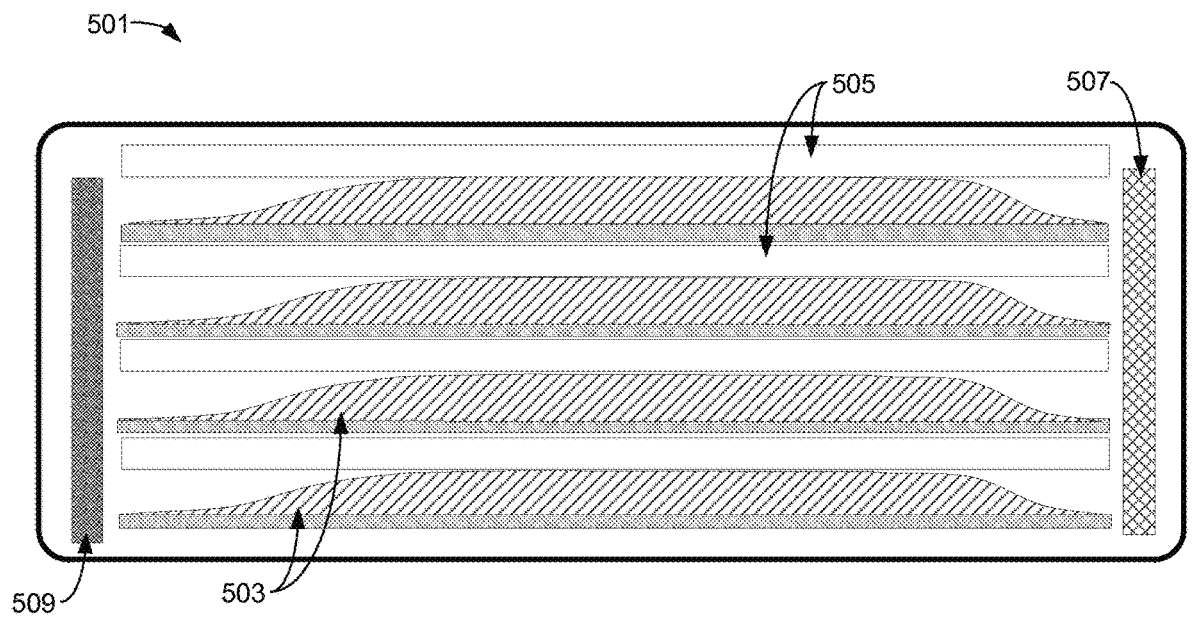
FIG. 5B illustrates a battery having void spaces to accommodate volume changes according to certain disclosed embodiments.

FIG. 5B depicts a battery stack 501 of unit cells 503 in which void spaces or compressible regions 505 are provided between the individual unit cells 503 to account for volumetric expansion during charge or discharge. In some battery cells, the cell 503 expands and contracts substantially over the course of a charge-discharge cycle, in some cases expanding by at least about 10%, at least about 15%, at least about 20%, or at least about 30%. In some cases expansion is about 30% or about 40%. If provisions are not made to accommodate this change in volume, the stack 501 would be subject unacceptably large internal stains, which could damage the stack 501 and lead to a premature end of life. Some battery materials may require a finite range of pressures to reduce interface resistances and achieve efficient operation. Such a battery may require a compressible element that applies continuous pressure to the electrodes despite expansions and contractions. One way to accommodate the volume change is to provide compressible regions 505 that expand when the unit cells 503 become more compact (i.e., when the battery discharges). The compressible regions 505 operate to provide pressure to the different portions of the unit cells 503 at all states of charge. Lithium plating and stripping may happen more efficiently under the pressure of the compressible regions 505. As depicted in FIG. 5B, battery stack 501 includes positive and negative terminals 507 and 509.

Figure 6A:
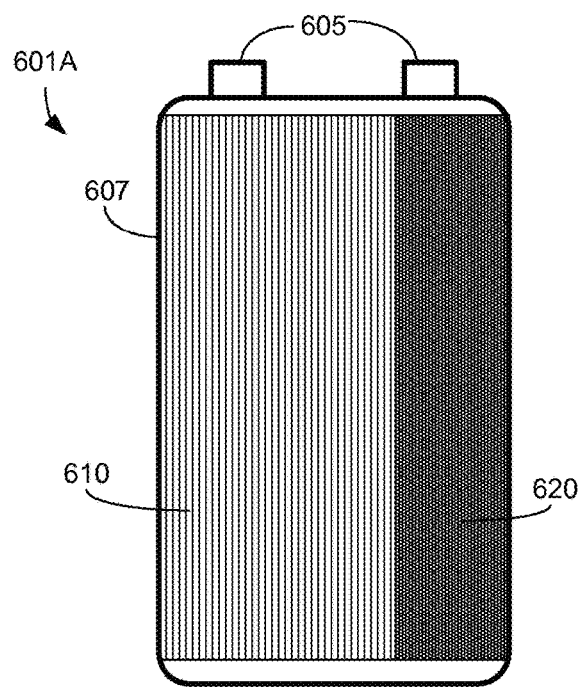
FIGS. 6A-6D show several battery designs incorporating compressible regions.

FIGS. 6A-6D show various embodiments of a battery having compression regions. FIG. 6A shows a battery 601A in a can 607 and with terminals 605. One of the terminals 605 is positive while the other is negative. Electrochemical battery components 610 are shown in vertical lines to represent the layers of material in the cell structure. Typically, these electrochemical battery components 610 include positive current collectors, positive electrodes, electrolyte, negative electrodes and negative current collectors in alternating layers. A compressible region 620 is shown in a dark background with a light dotted pattern. This region 620 may be referred to as a compressible region, but it is understood that in certain embodiments this region is substantially void. The compressible region 620 may take a number of distinct forms, as discussed further below. In the embodiment of FIG. 6A, the battery 601A has a single compressible region 620 positioned near the side of the battery can 607, proximate the single region of electrochemical battery components 610.

The battery 601A may be of various dimensions. In certain embodiments, the width of the battery (as measured left to right in FIG. 6A) is between about 0.5-3 cm, for example between about 1-2 cm. In some cases the number of unit cells in a stack is between about 20-300, for example between about 100-200.

Figure 6B:
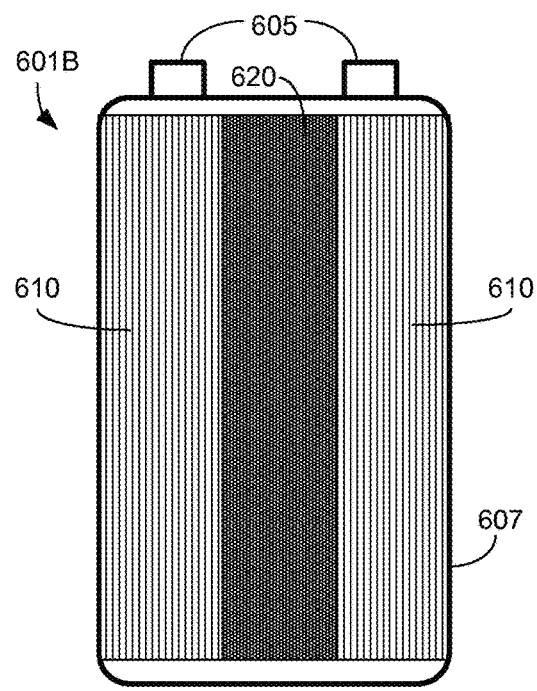
Figure 6C:
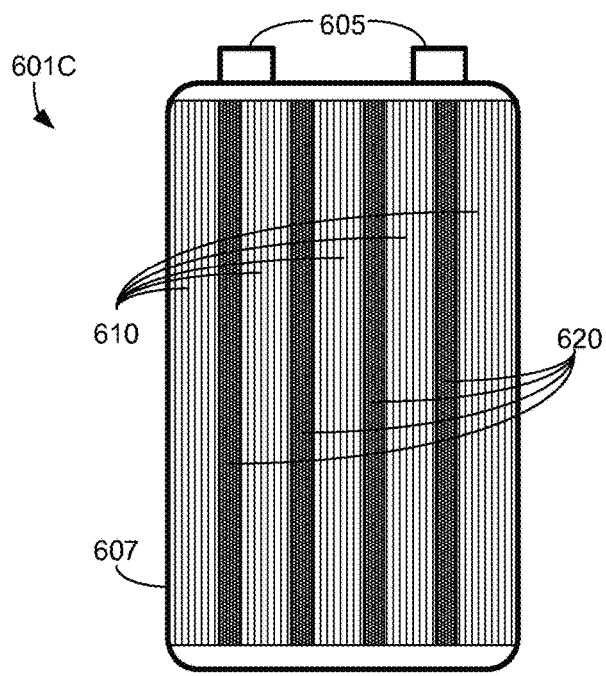
Figure 6D:
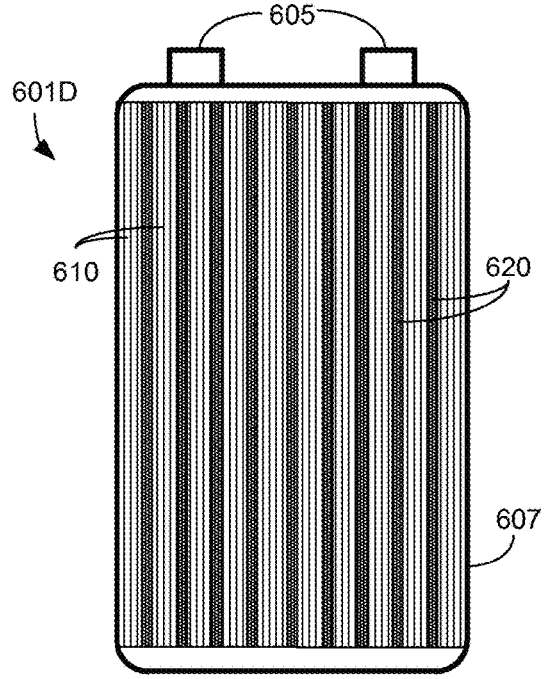

FIG. 6B shows an embodiment of a similar battery 601B. Here, the electrochemical battery components 610 are split into two regions. These two regions 610 are separated by a single region of compressible material 620. In a similar embodiment, the battery may employ a single region of electrochemical battery material between two compressible regions. The configuration shown in FIG. 6B may have certain advantages compared to that shown in FIG. 6A. For example, when the batteries undergo volume expansion during cycling, electrical components and connections between individual battery components (e.g., between the negative current collectors and the negative terminal) will move within the can 607. The farther these elements and connections move, the more flexible they need to be to accommodate such movement. This is especially true of the electrical connections between components. Thus, embodiments that allow volume expansion to occur locally in smaller regions need less flexibility in this regard.

Further expanding on this concept, batteries 601C and 601D (FIGS. 6C and 6D) utilize an increased number of compressible regions 620 spread between the various battery component regions 610. For the sake of clarity, only a few of the battery component regions 610 and compressible regions 620 are explicitly labeled in FIG. 6D. Although increasing the number of compressible regions 620 and electrochemical battery material regions 610 may simplify certain engineering aspects as described above, this modification may also introduce other engineering challenges. For example, batteries having greater numbers of each type of region may be more difficult to manufacture simply due to the increased complexity of the battery.

A parameter that may characterize the batteries shown in FIGS. 6A-6D is a compressible/cell ratio. This ratio is defined as the number of compressible regions 620 present in a battery stack, divided by the number of unit cells (anode-cathode pairs) in the battery stack. Assuming that batteries 601A-601D each have 100 unit cells, batteries 601A and 601B have a compressible/cell ratio of 0.01, while battery 601C has a compressible/cell ratio of 0.04, and battery 601D has a ratio of 0.09. In certain embodiments the compressible/cell ratio is as high as about 1, meaning that each unit cell has a corresponding compressible region. Where the number of compressible regions barely exceeds the number of unit cells (e.g., 10 unit cells within 11 compressible regions, or 5 unit cells within 6 compressible regions), the compressible/cell ratio is defined to be within the "about 1" range disclosed above. In other embodiments, the compressible/cell ratio may be as high as about 2, meaning that there are approximately two compressible regions per unit cell. The compressible/cell ratio may be lower than 0.01 in certain cases, for example as low as about 0.001.

One feature that is not shown in FIGS. 6A-6D is that the electrochemical battery material regions 610 may be contained in a pouch to help protect the materials and potentially facilitate fabrication methods. Where a pouch is used, there is less concern about any adverse reactions (e.g., dissolution, corrosion) that may happen between the electrochemical battery materials and any materials used in the compression region, or between the electrochemical materials and the rest of the cell, e.g., the can. The use of pouches to seal battery materials can also make the batteries safer to fabricate and use. Any number of individual unit cells may be contained within a pouch. While pouches have been used in other battery contexts, they are not typically used in conjunction with rigid can materials.

As mentioned above, there are numerous ways to implement the compressible regions (also referred to as compression regions). In one embodiment, the compressible region is made of a sheet or block of porous or textured resilient material. The material may be provided in an open cell format or a closed cell format. In another embodiment, the compressible region includes one or more rigid, semi-rigid, or flexible plates in combination with one or more mechanical compression members.

A mechanical compression member is one that contracts upon application of a force and expands to its original state (or substantially its original state) after the force is removed. A good quality compression member will be able to expand and contract many times without losing its "springiness." In more technical terms, this means that the compression member should have a low compression set. Steel is one example of a material that has a low compression set, as it generally requires heating to a very high temperature before it deforms. In certain embodiments, the material used to form the compression region (and any structures therein) should be able to withstand high temperatures (e.g., 60-120° C., for example 60-100° C.) such that it does not break down during cycling, conditioning, or other typical processes. The material may also need to be stable at low temperatures (e.g., as low as about −40° C., or −20° C., or 0° C.). The materials should be stable at the relevant operating pressures, which may be as low as about 1 kPa absolute. In some embodiments, the operating life of the battery is expected to be about 12 years and/or about 1000 full cycles.

Thus, the materials should be stable over this timeframe and cycling demand. Where planes are used, the through plane thermal conductivity may be greater than about 0.1 W/mK.

In one example embodiment, the compression region has an area of about 70 mm by 80 mm. The free thickness ($T_{free}$) of the compressible region is about 6 mm or greater, and the solid thickness ($T_{solid}$) is about 2 mm or less. This results in a working thickness of about 4 mm.

One type of mechanical compression member is a spring. Many different styles of springs may be used. Another type of compression member is a punched plate. A third type is a gas-containing sealed package. A fourth type is a simple sheet or block of porous open or closed cell compressible material (either without plates, as described above, or between plates). In an open cell format, adjacent pores in the material are substantially connected, allowing any gas present in the pores to escape when the material is compressed. In a closed cell format, the adjacent pores are not substantially connected to one another, such that when the material is compressed, gas present in the pores does not escape, but rather is compressed with the material. A block of material in an open cell format may also be referred to as a sponge. Other types of compression members may be used, as well.

Figure 7:
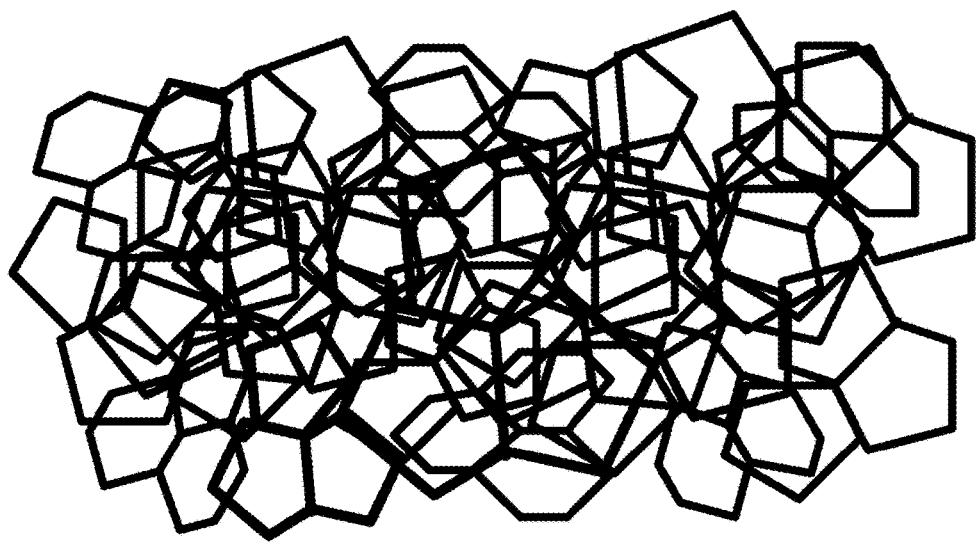
FIG. 7 illustrates a metal foam material.

The properties of an interface between a compressible region and an electrochemical region may affect the performance of a battery. As mentioned, this interface may include a rigid, semi-rigid, or flexible plate in some embodiments. In other embodiments, this plate is absent. The use of more rigid plates may help promote uniform application of pressure to the electrochemical battery material region. In certain embodiments, the compressible structure may have a stiffness of between about 1-10 atm per mm. However, in some implementations it may be preferable for the plates to be more flexible, such that they can accommodate a degree of non-uniform volume expansion within the electrochemical battery material region. In embodiments where no plate is used at the interface, the ability to compensate for non-uniform volume expansion may be especially great. The design of the interface should balance competing concerns regarding the desired force to be applied by the compressible region, as well as the desired uniformity of that force.

Where the compression region is made of an inherently springy material, the material should be able to expand and contract within the battery can. In some embodiments the springy material is a sheet or block of porous material such as foam made from silicone, metal, or a polymer. These foam materials may have a sponge-like structure containing many pores/paths, as shown in the metal foam drawing in FIG. 7. In this figure, the dark lines represent metal or other structural material and the white spaces represent void spaces within the metal material. As is known to those of skill in the art, a metal foam structure has a resilient springiness.

Shapes other than sheets or blocks may be used as well, depending on the particular application. One way to vary the properties of the compression region is to use fiber reinforcement to orient the fibers of the compressible region in a certain direction. This fiber reinforcement may help provide some anisotropic properties to the compressible region, which may be beneficial in certain embodiments.

Figure 8A:
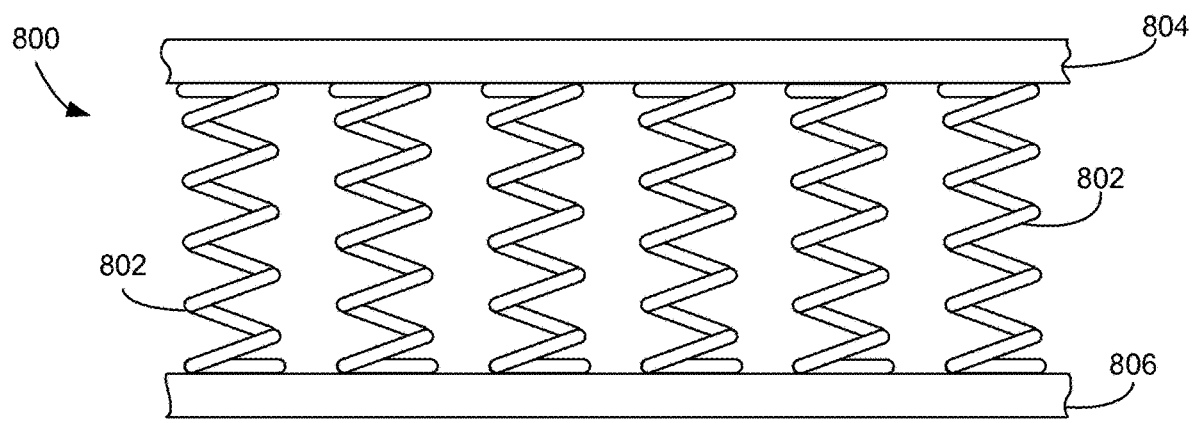
FIG. 8A shows a cross-sectional view of one embodiment of a compressible region where a plurality of springs are placed between two plates.

FIG. 8A provides a schematic example of a compressible region 800 that includes a plurality of compression coil springs 802 between two plates 804 and 806. When present in a battery can, the plates 804 and 806 may be oriented parallel to the layers of electrochemically active materials. Volumetric expansion happens in a direction normal to the plates and electrochemically active layers (i.e., in the up/down direction in FIG. 8A). The springs 802 may contract and expand to compensate for changes in the volume of the electrochemically active region(s). In any embodiment where the compressible region includes one or more plates, one of the plates may be the battery can, rather than a separate plate. Further, in any embodiment where the compressible region includes parts that move or scrape against one another, such parts may be coated (e.g., with polymer) to prevent material from shearing off and causing shorts or other problems within the battery. Such coatings may be especially important where the moving/shearing parts are metal.

Figure 8B:
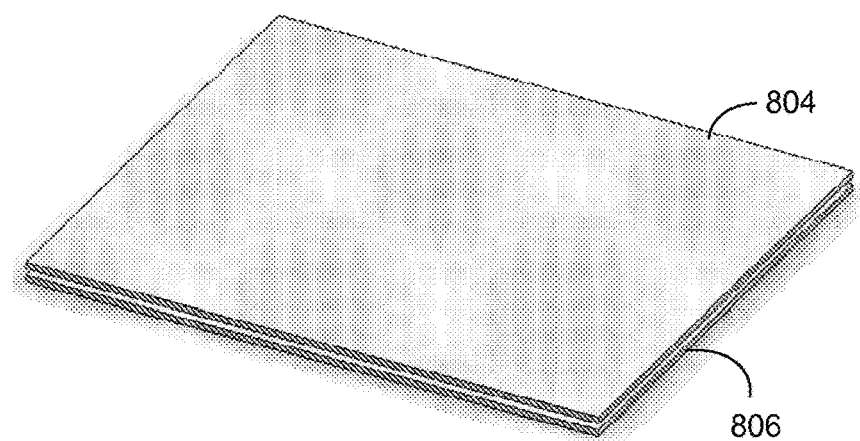
FIG. 8B shows a perspective view of the compressible region of FIG. 8A.
Figure 8C:
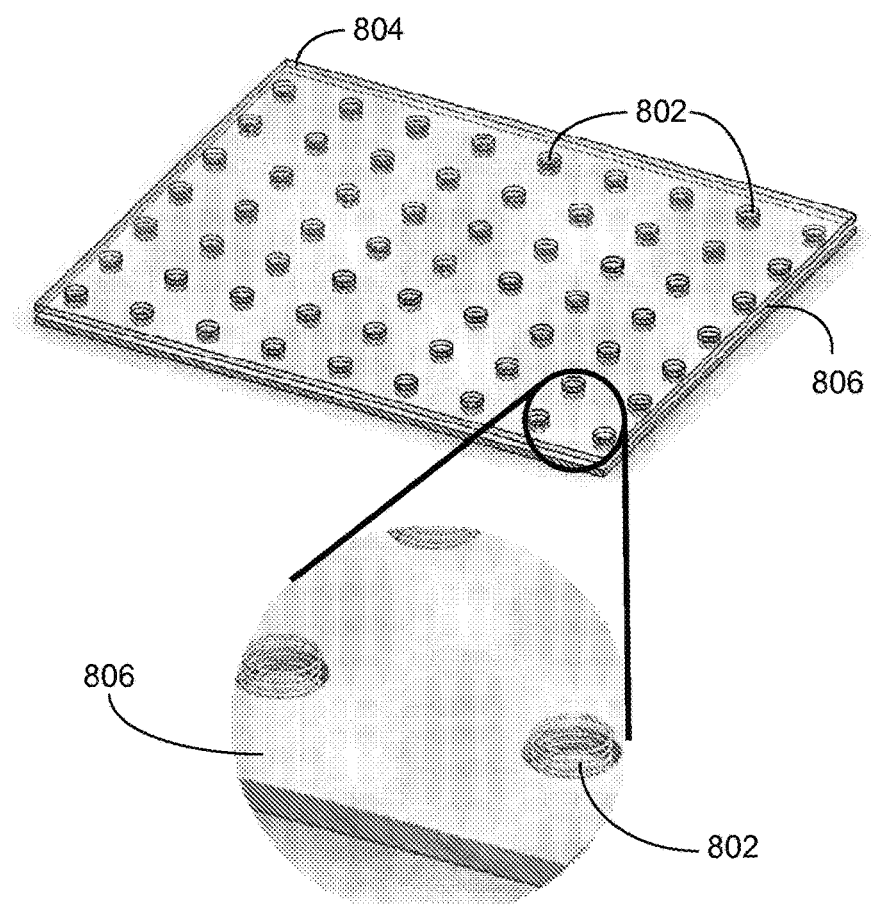
FIG. 8C shows a cutaway view of the compressible region of FIGS. 8A-8B.

FIG. 8B illustrates a perspective view of the compressible region of FIG. 8A. In this figure, only the plates 804 and 806 are visible. FIG. 8C shows an interior view of the compressible region of FIGS. 8A-8B. The top plate 804 is transparent in this figure, revealing the plurality of springs 802 between the plates 804 and 806. As shown in FIG. 8C, one or more of the plates 804 and 806 may have recesses to help keep the springs 802 in position.

Figure 9:
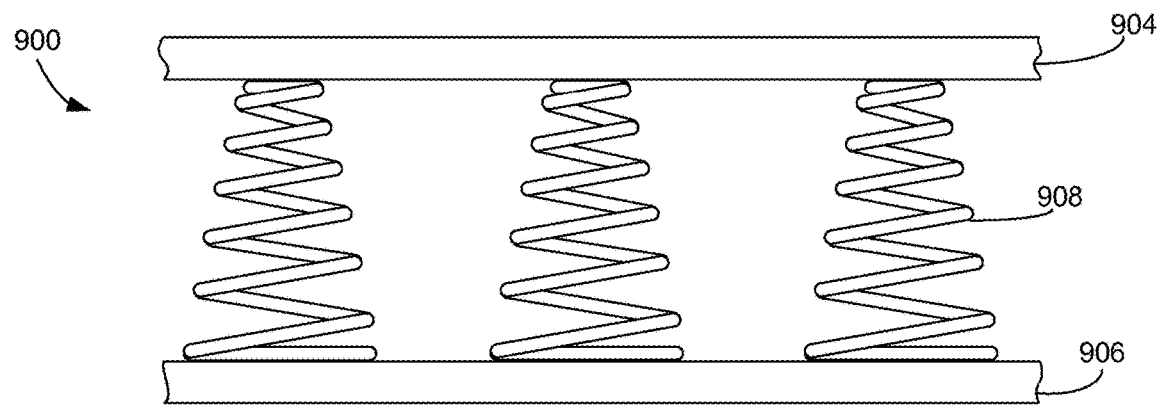
FIG. 9 shows a cross-sectional view of an embodiment of a compressible region having a plurality of conical compression springs positioned between two plates.

FIG. 9 shows a similar embodiment of a compressible region 900 that includes a plurality of conically-shaped compression springs 908. Conical compression springs 908 allow some coils are able to fit inside one another when the spring 908 is compressed. This means that when the conical compression spring 908 is compressed, it takes up relatively little room in the direction of compression.

Figure 10:
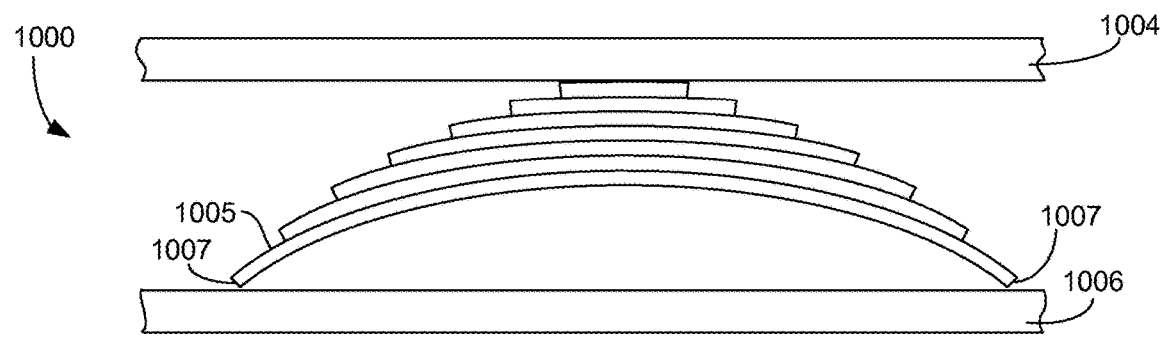
FIG. 10 shows a cross-sectional view of an embodiment of a compressible region having a leaf spring positioned between two plates.

FIG. 10 shows an alternative embodiment of a compressible region 1000 that includes a leaf spring 1005 positioned between two plates 1004 and 1006. Different embodiments may use different numbers of individual leaves. The leaves may be rod or plate shaped. In some embodiments, only a single leaf is used. In other embodiments, at least two leaves are used. The ends 1007 of the spring leaf 1005 may be designed in a number of ways (e.g., flat, curved, bent/rounded under or outwards, attached or unattached to the plate, etc.). Further, where a leaf spring is used, the plates may include pads/raised members or other structures to help keep the leaf spring in place, help distribute the force from the leaf spring, etc. In certain embodiments, one or more leaves may be integrated with a plate.

Figure 11:
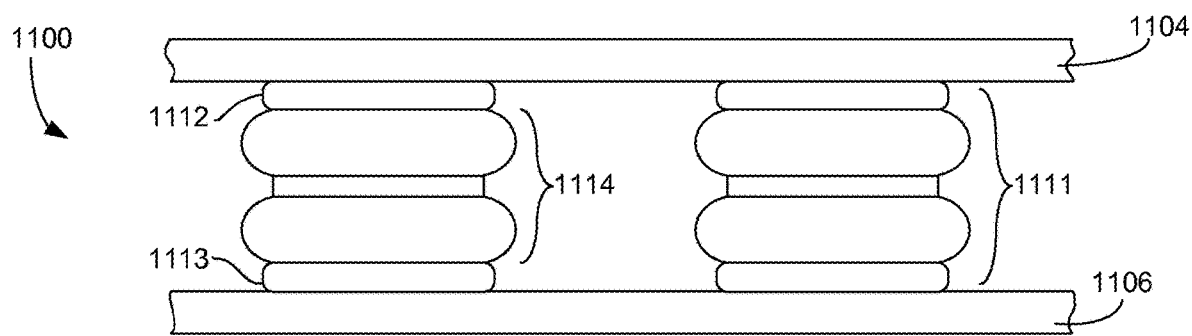
FIG. 11 shows a cross-sectional view of an embodiment of a compressible region having air springs positioned between two plates.

FIG. 11 shows an alternative embodiment of a compressible region 1100 that includes an air spring 1111 between two plates 1104 and 1106. The air spring 1111 has a top surface 1112 and a bottom surface 1113 that rest against the plates 1104 and 1106. In between these top and bottom surfaces 1112 and 1113 is a semi-flexible portion 1114, which is filled with a gas. When the plates 1104 and 1106 are compressed toward one another, the semi-flexible region 1114 changes shape, becoming shorter and slightly wider. At the same time, the pressure inside the semi-flexible region may increase, and then decrease when the plates 1104 and 1106 are moved apart.

Figure 12:
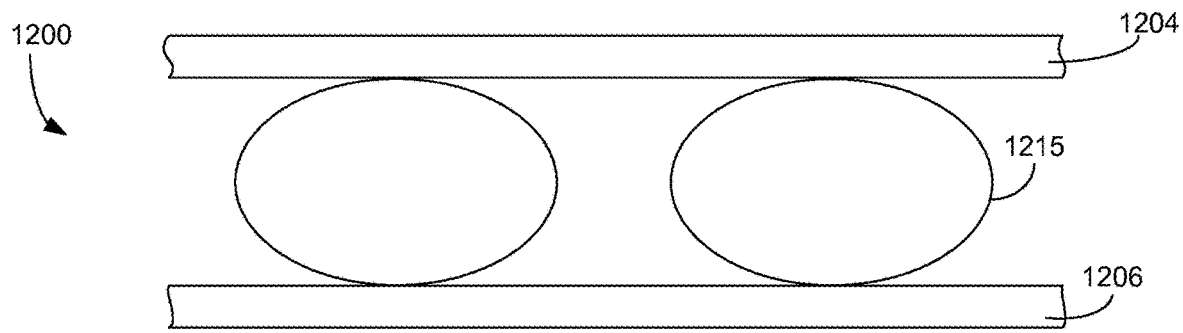
FIG. 12 shows a cross-sectional view of an embodiment of a compressible region having balloons positioned between two plates.

FIG. 12 shows a related embodiment of a compressible region 1200 that includes balloons 1215 between two plates 1204 and 1206. The balloons are gas-containing sealed packages, and they change shape as they are compressed, much like in the embodiment of FIG. 11. In fact, the semi-flexible portion 1114 of FIG. 11 operates on basically the same principles as the balloon 1215 of FIG. 12. Any sealed, gas-filled, flexible or semi-flexible structure (e.g., the balloon 1215 of FIG. 12 and the semi-flexible portion 1114 of FIG. 11) may be referred to as a balloon. One non-limiting example of a material that may be used to fabricate a balloon is non-porous silicone rubber. One non-limiting example of a gas that may be included within a balloon is air. The balloon materials (both the outer material and the inner gas) may be chosen to achieve the desired compression properties.

Figure 13:
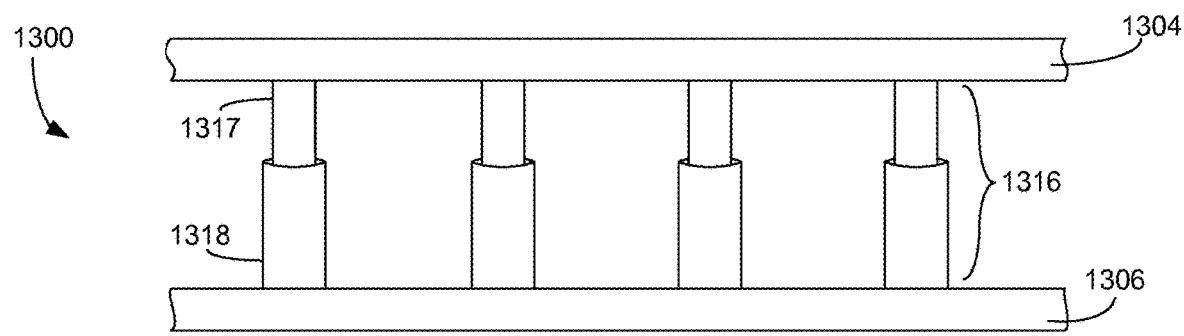
FIG. 13 shows a cross-sectional view of an embodiment of a compressible region having a plurality of gas springs positioned between two plates.

FIG. 13 shows another alternative embodiment of a compressible region 1300 that includes a plurality of gas springs 1316 between two plates 1304 and 1306. The gas spring 1316 includes a sleeve portion 1318 and a piston portion 1317. The sleeve portion 1318 is filled with gas that gets compressed by the piston 1317 as the upper and lower plates 1304 and 1306 move towards one another. One difference between the gas springs 1316 of this embodiment and the balloons in the embodiments shown in FIGS. 11 and 12 is that the sleeve portion 1318 of a gas spring 1316 does not deform in the same way that the balloons do.

Figure 14:
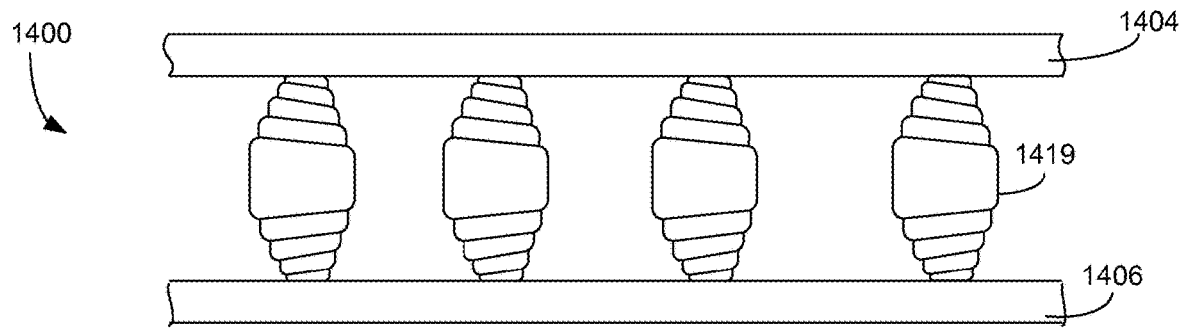
FIG. 14 shows a cross-sectional view of an embodiment of a compressible region having a plurality of secateur springs positioned between two plates.

FIG. 14 shows a further embodiment of a compressible region 1400 that includes a plurality of secateur springs positioned between two plates 1404 and 1406. Secateur/volute springs are similar to the conical compression springs shown in FIG. 9 in that when the spring is compressed, the different portions of the spring become nestled inside one another, thus helping minimize the space that a compressible region would occupy when compressed.

Figure 15:
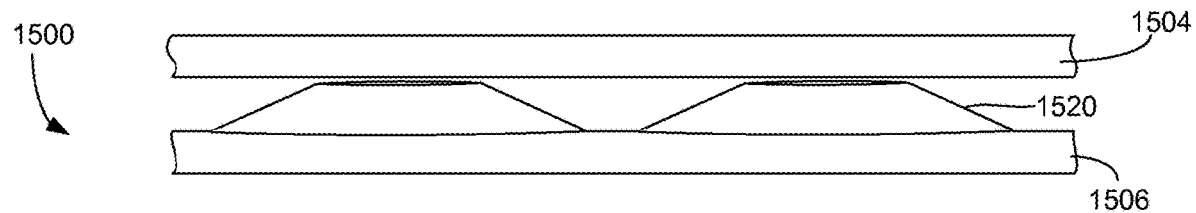
FIG. 15 shows a cross-sectional view of an embodiment of a compressible region having domed washers between two plates.

FIG. 15 shows another embodiment of a compressible region 1500 that includes spring washers 1520 between two plates 1504 and 1506. The washers 1520 deflect to a certain degree when a force is applied. In similar embodiments, the washers may be stacked together to achieve particular spring characteristics. While the embodiment shown in FIG. 15 uses a Belleville washer, in other embodiments some or all of these washers may be replaced with curved washers and/or wave washers. By stacking these types of irregularly shaped washers, a wave spring may be formed. Certain implementations use such wave springs between opposing plates. Similarly, a wave spring may be made of a single piece of material, rather than a stack of individual pieces.

Figure 16A:
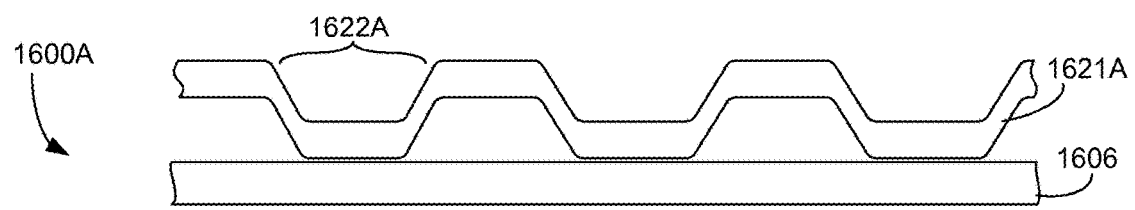
FIGS. 16A-16B show a cross-sectional views of embodiments of a compressible region having a flat plate a punched plate.

FIG. 16A provides an additional embodiment of a compressible region 1600A including a punched plate 1621A and a flat plate 1606. The punched plate 1621A has shapes 1622A punched into the face of the plate 1621A. When these shapes 1622A contact the flat plate 1606, they deflect to a degree, thereby accommodating volume expansion in other parts of the device. The shapes 1622A may be of various designs including circular dimples, square dimples, etc.

Figure 16B:
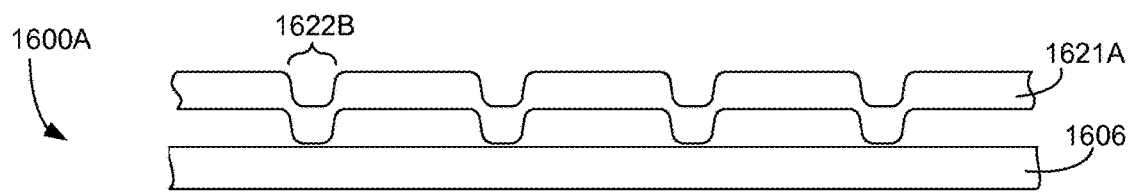

FIG. 16B shows an alternative embodiment where the punched plate 1621B has smaller shapes 1622B punched into it. While the punched plate 1621A in FIG. 16A appears to have a substantially corrugated surface, the surface of punched plate 1621B in FIG. 16B is somewhat flatter.

Figure 16C:
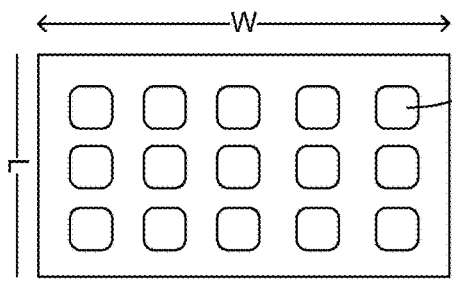
FIGS. 16C-16D show top-down views of embodiments of a punched plate.
Figure 16D:
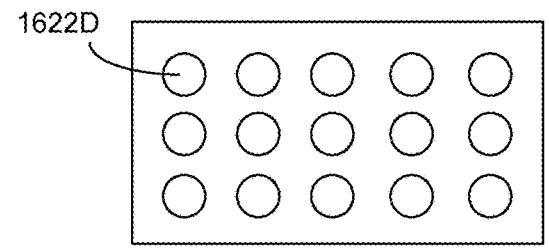

FIGS. 16C-16D show top down views of alternate embodiments of a punched plate. In FIG. 16C the punched shapes 1622C are square, and in FIG. 16D the shapes 1622D are circular. Many different shapes and divot placements are possible. The overall size of the punched plate will vary depending on the application, but in many cases the punched plate will be roughly the same length and width (labeled in FIG. 16C as L and W) as a flat plate, which may have roughly the same length and width as an electrochemically active battery material region. In other words, the plates and the face of the electrochemically active material region may be coextensive or substantially coextensive (e.g., within about 10%). Various polymers, metals, and other materials may be used to fabricate a punched plate. In one example, the plate is made from a polyimide polymer such as Ultem from SABIC of Riyadh, Saudi Arabia. The Ultem family of materials include various polyetherimides. In other examples, the punched plate is fabricated from a metal plate.

Figure 17:
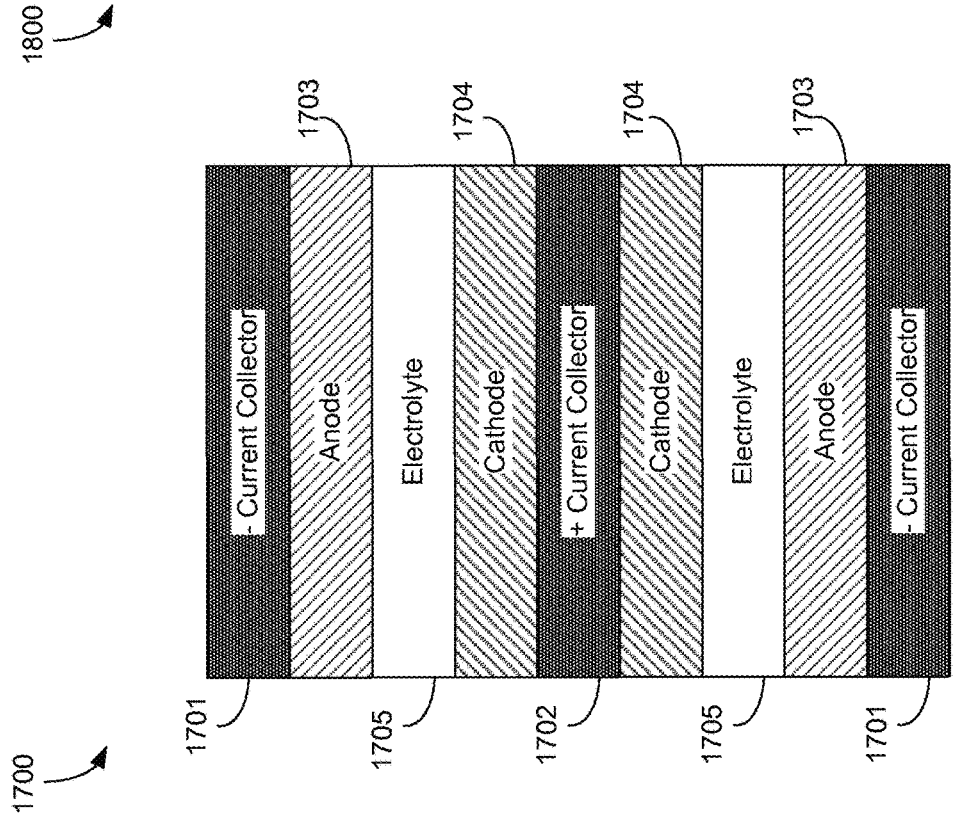
FIG. 17 shows a battery stack having layers of conductive, compressible material in place of conventional current collectors.

Another way to implement a compressible region is to include a layer of compressible material directly in a stack of electrochemically active battery materials. FIG. 17 shows an embodiment of a battery stack 1700 where one or more conventional current collectors are replaced by conductive compressible material layers 1701 (negative current collectors) and 1702 (positive current collectors). In the depicted embodiment, the layers 1701 and 1702 still function as current collectors, as they are made from a conductive material. The negative current collectors 1701 are surrounded by anodes 1703, and the positive current collectors 1702 are surrounded by cathodes 1704. In between each anode 1703/cathode 1704 pair is a layer of electrolyte 1705. The materials used to implement such compressible current collectors should be conductive and elastic. Examples of suitable materials include, but are not limited to, nanofoams, aerogels, and sheets of non-woven fiber. In some cases, the materials are made from carbon. In certain similar embodiments, only some of the conventional current collectors are replaced with conductive compressible materials. For example, only the positive current collectors or only the negative current collectors may be replaced. In some embodiments, less than all of the conventional current collectors of a particular type (positive or negative) are replaced. In other words, a battery stack may include any combination of conventional positive current collectors, conventional negative current collectors, conductive/compressible positive current collectors, and conductive/compressible negative current collectors.

Figure 18:
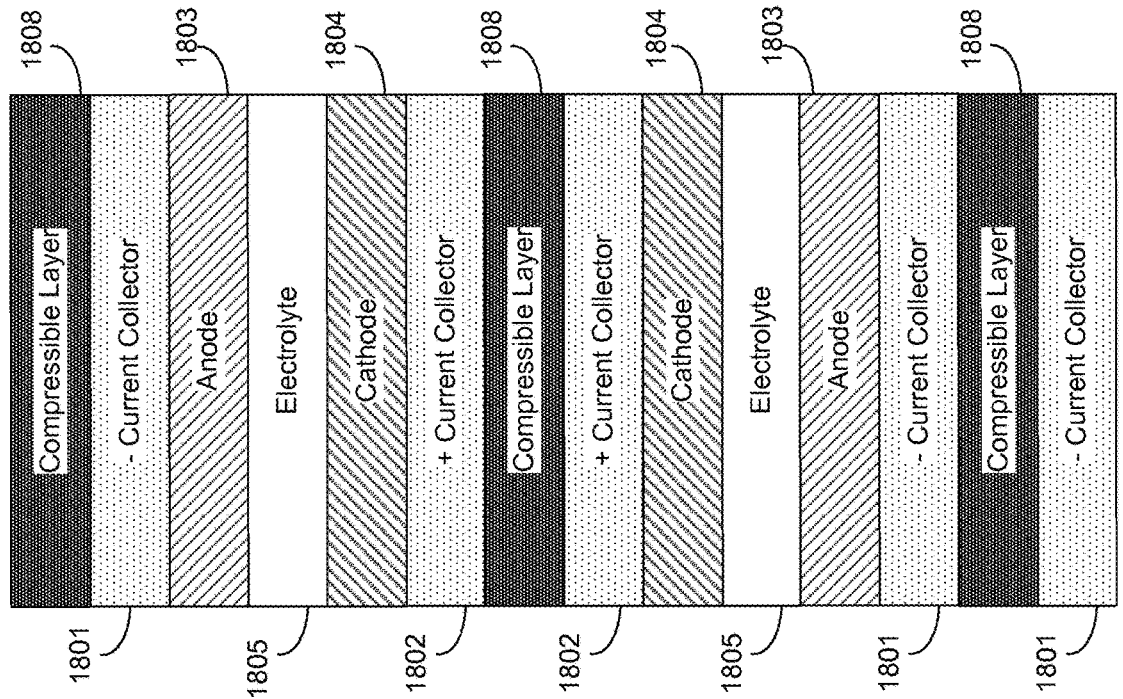
FIG. 18 shows a battery stack having layers of conductive, compressible materials in addition to other conventional battery materials.

In a similar embodiment, compressible layers are added to a stack of electrochemically active battery materials, but instead of replacing the current collectors, are included as an additional component. FIG. 18 shows a battery stack 1800 having compressible layers 1808 inserted directly into the stack 1800. Here, the compressible layers 1808 are positioned directly between current collector layers (directly between sets of positive current collectors 1802 and directly between sets of negative current collectors 1801). As used herein, the phrase "directly between" means that the layers are in contact with one another, and that there are no other layers in between the relevant layers. In the context of FIG. 18, for example, this means that compressible layer 1808 is between positive current collector layers 1802, without any other layers between the positive current collector layers 1802. The same can be said about the position of other compressible layers 1808 in relation to the negative current collector layers 1801.

In other embodiments, the compressible layers may be positioned directly between adjacent positive and negative current collectors. In such embodiments, the material of the compressible layer should not be conductive, or the layer should be coated with a non-conductive material, to prevent current from traveling through the compressible layer between a positive and negative current collector. Where the compressible layer is positioned between two current collectors of the same polarity, the conductive properties of the layer are less important. Examples of suitable conductive materials include, but are not limited to, carbon nanofoams, aerogels, and sheets of non-woven carbon fiber.

Figure 19:
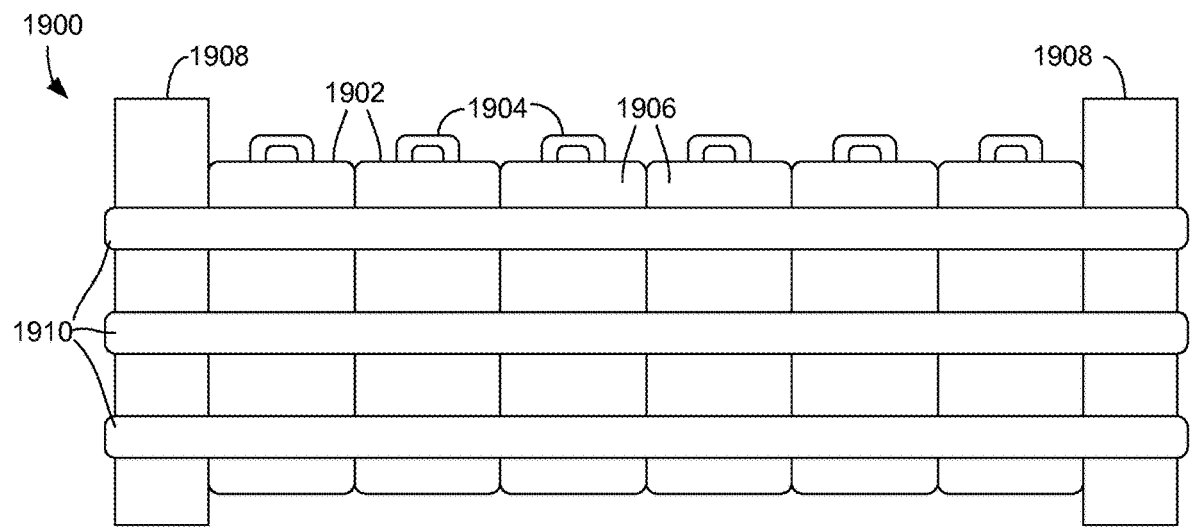
FIG. 19 shows a battery pack having a plurality of cells between two plates, surrounded by elastic bands.

Another way to accommodate the volumetric change in the electrochemically active materials is to address it at the battery pack level. In these embodiments, a single mechanism may act to accommodate volumetric expansion in many battery cells at once. FIG. 19 illustrates an embodiment of a battery pack 1900 including several battery cells 1902, each having terminals 1904 attached to a pouch 1906. The pouches 1906 are flexible and expand as the electrochemically active materials inside them expand. On either side of the battery pack 1900 are plates 1908. The plates 1908 and battery cells 1902 are surrounded or substantially surrounded by straps 1910. The straps 1910 are elastic such that they can stretch as the volume of the battery cells 1902 increases. The straps 1910 may be designed such that they provide suitable elastic conditions. The number of straps may vary, and may be as few as 1. The plates 1908 may be rigid, semi-rigid, or flexible, as described in relation to other embodiments using plates. Examples of materials that may be used to construct the straps include rubber bands, steel or other metal formed in a flexible pattern, etc.

In this context, when it is said that the straps may substantially surround the plates and battery cells, this is defined to mean that the straps may surround enough of these elements to keep them together in a compressible manner. One example of a design in which the straps substantially surround the plates and battery cells (but do not literally surround them) is where a first strap attaches to an edge of each plate, and a second strap attaches to the opposite edges of each plate. In that design, one strap will run down each side of the battery pack (at least two sides). In comparison with FIG. 19, the straps of this embodiment would be fastened to the plates, rather than extending around them. The number of straps on each side may also be increased.

Figure 20:
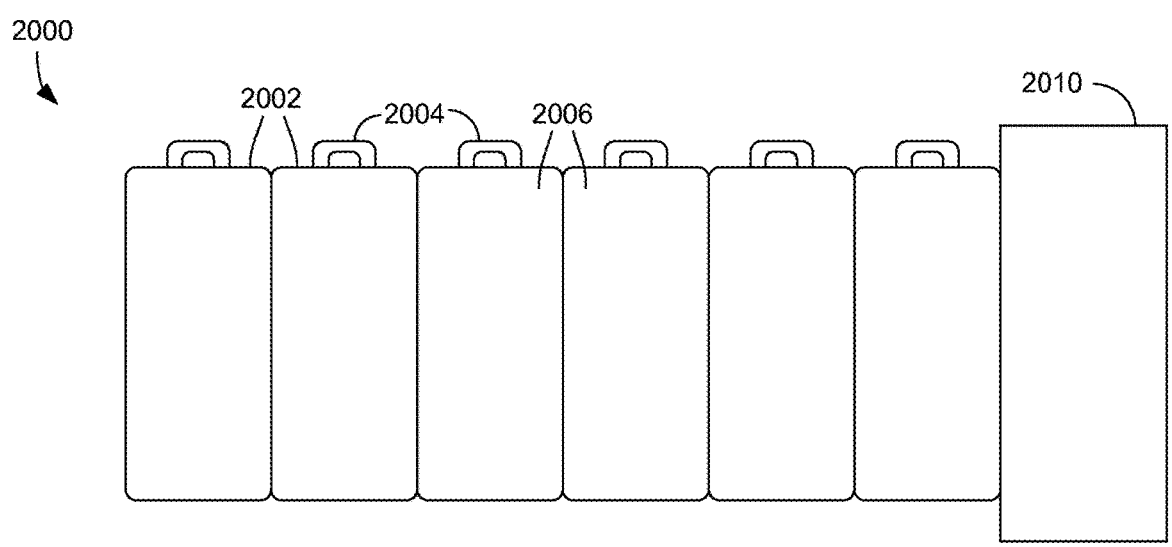
FIG. 20 shows a battery pack having a plurality of cells and a compressible region.

FIG. 20 illustrates an alternative way to deal with volume change at the battery pack level. Here, a battery pack 2000 includes a plurality of battery cells 2002, each having terminals 2004 attached to a flexible pouch 2006. A compressible region 2010 is positioned on one side of the battery pack 2000. Typically, the entire battery pack assembly 2000 will be placed in some sort of rigid container (not shown). As the pouches 2006 expand, the compressible region 2010 gets smaller. The compressible region 2010 may take any of the forms disclosed herein, including the embodiments shown in FIG. 7 through FIGS. 16A-D, for example. However, region 2010 will often be significantly larger than compressible regions used inside cells. In alternative embodiments, the compressible region 2010 may also be located at a different position in the battery pack 2000, for example between individual battery cells 2002. In some embodiments, more than one compressible region is used in a battery pack. In a particular embodiment, the compressible regions and battery cells are alternated in the battery pack. In the embodiments of FIGS. 19 and 20, the battery cells are not contained in individual rigid cans, as this would prevent them from expanding as necessary.

Where the compressible region is outside a cell, one can replace the compressible region easily and safely, if necessary. Further, where the compressible region is outside a cell, there is relatively little risk of adverse reactions happening between the compressible material and the electrochemically active battery materials. Where the compressible region is inside a cell, however, care should be taken to ensure that the materials used in the compressible region are either protected from the electrochemically active materials (e.g., the electrolyte, especially where liquid electrolyte is used), or are resistant to the materials and any byproducts that are released from the electrochemically active materials (e.g., any offgas). The use of pouches may help in this regard.

The battery stack/cell/pack designs disclosed herein may be used in a variety of contexts, and are in no way limited to the field of automobiles. The disclosed embodiments may also be used in uninterruptible power supplies, consumer electronics, etc.

Thermally Interruptible Components in Cells

Various embodiments concern thermally interruptible components of the battery that control thermal excursions that might damage the battery or other components of the vehicle. The embodiments described herein concern thermally interruptible cathode current collectors and thermally interruptible solid-state electrolytes.

Safety concerns may arise when the cells of the primary energy pack reach a high temperature—e.g., about 100° C. or higher (or about 200° C. or higher). In some scenarios, a short in a cell or multiple cells in a stack results in a local hot spot in the stack. Such a short can produce a temperature of about 300-400° C. or higher (e.g., over 2,000° C. locally). Such problems may be mitigated by designing cells and/or packs to terminate operation by one or more mechanisms that dramatically decrease their electronic or ionic conductivity.

A distinction may be drawn between a soft short that slowly heats up the cell in a controlled manner and a harder, local short. In the cases of a soft short, interrupting the electrolyte of the entire cell may be desirable as this works by shutting down the whole cell. The cell may be isolated from other cells in parallel through another mechanism such as an over-temperature shutdown device at the terminal. With a harder, local short, the pack may benefit from cutting off the electron supply locally.

One mechanism makes use of the fact that a battery stack contains a parallel architecture such as that depicted in FIG. 4 or 5, in which each current collector is relatively thin. In such designs, the positive electrode current collector may be made from, for example, steel, aluminum, copper, or zinc. Each of these, as well as some other current collector materials, may fluorinate when exposed to certain fluorine containing positive electrode materials (e.g., an iron or cobalt fluoride), particularly when those materials are in relatively high states of charge. The interface between the positive electrode material and the current collector is thermodynamically unstable. This instability can be used to produce a safety reaction under conditions that kinetically favor fluorination of the current collector (e.g., high temperatures). The safety reaction allows the battery stack to fail in a safe manner, thereby preventing more dangerous conditions from arising.

In some designs, the positive electrode and associated positive current collector interface is thermodynamically unstable, but kinetically stable at normal operating temperatures, e.g., about 100° C. or less. However, the instability is manifest by a chemical reaction at higher temperatures such as the temperatures where damage from thermal excursions is likely. For example, the interface may react at temperatures of about 300° C. or greater (e.g., 800° C. locally), for example, in the range about 300 to 400° C.

The thermodynamic instability is used to advantage by a careful choice of a particular positive electrode current collector material and positive electrode active material. For example, various embodiments employ fluorinated iron or other fluorinated metals in the positive electrode. By choosing a current collector material such as a metal that tends to react with the charged positive electrode material, one has effectively built in a thermally interruptible positive electrode current collector. The reaction of the current collector metal and the positive electrode material degrades the quality of the positive electrode and prevents it from conducting further current, thereby shutting off a runaway reaction to thereby prevent or minimize damage to individual batteries in the primary energy pack or other components in the vehicle. This is especially effective when the cathode material contains metals in a high oxidation state and the current collector contains metals in the neutral state. For example, an iron current collector in proximity with an iron trifluoride ($Fe^{3+}$) cathode is thermodynamically unstable, as iron trifluoride is a strong fluorinator. At high temperatures, the iron trifluoride may fluorinate the iron current collector, thereby degrading the positive electrode to prevent it from conducting further current.

Another type of thermal protection is provided by electrolyte designs in which high temperatures reduce the electrolyte conductivity. Conventionally, this protection is afforded by ion conducting elements that become non-conducting at high temperatures as a result of polymer electrolyte flowing into and blocking pores. However, this protection is limited to polymer based electrolytes. In certain embodiments, a thermally interruptible solid-state electrolyte may be employed to protect against runaway reactions in the batteries of the primary energy stack.

In some examples, the electrolyte undergoes a phase transition from an ion conducting phase to and ion insulating phase at temperatures deemed to present a dangerous condition, e.g., about 300° C. In one example, the lithium ion conductivity in the low temperature stable phase may be about 1e-4 S/cm, and about 1e-8 S/cm in the high temperature phase. In other embodiments, the electrolyte does not change phase at elevated temperatures but does have a lower ion conductivity at higher temperatures. For example, in an amorphous or glassy electrolyte, the structure may change in a manner that decreases the ion conductivity though the phase is still amorphous or glassy.

Operational Characteristics for Multi-Plateau Discharge Curves

In various embodiments, a discharge and/or charge control algorithm is employed that operates the batteries of the primary energy pack in particular regions of the charge discharge curve for the battery.

Figure 21:
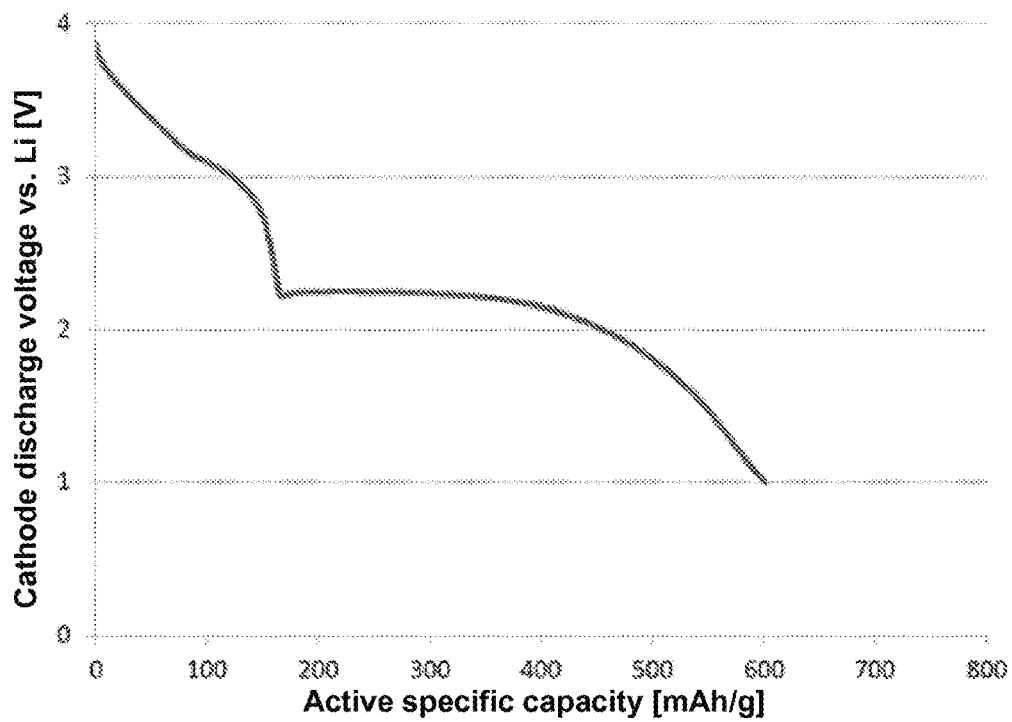
FIG. 21 shows a charge-discharge curve illustrating an intercalation region and a phase change region for an exemplary primary energy pack.

In the depicted example of FIG. 21, the region from about 0-150 mAh/g is the intercalation region, and the region from about 150-600 mAh/g is the phase change region.

In one example, a charging algorithm is employed that maintains the batteries of the primary energy pack in the region of the discharge curve defined by intercalation of lithium ions. Such operation may be most appropriate when frequent driving or other cause of frequent cycling is employed for the primary energy pack. It is believed that operating in the intercalation region, particularly during frequent cycling, reduces the amount of degradation of the positive electrode material and thereby prolongs it cycle life and reduces the frequency of required conditioning.

Figure 22:
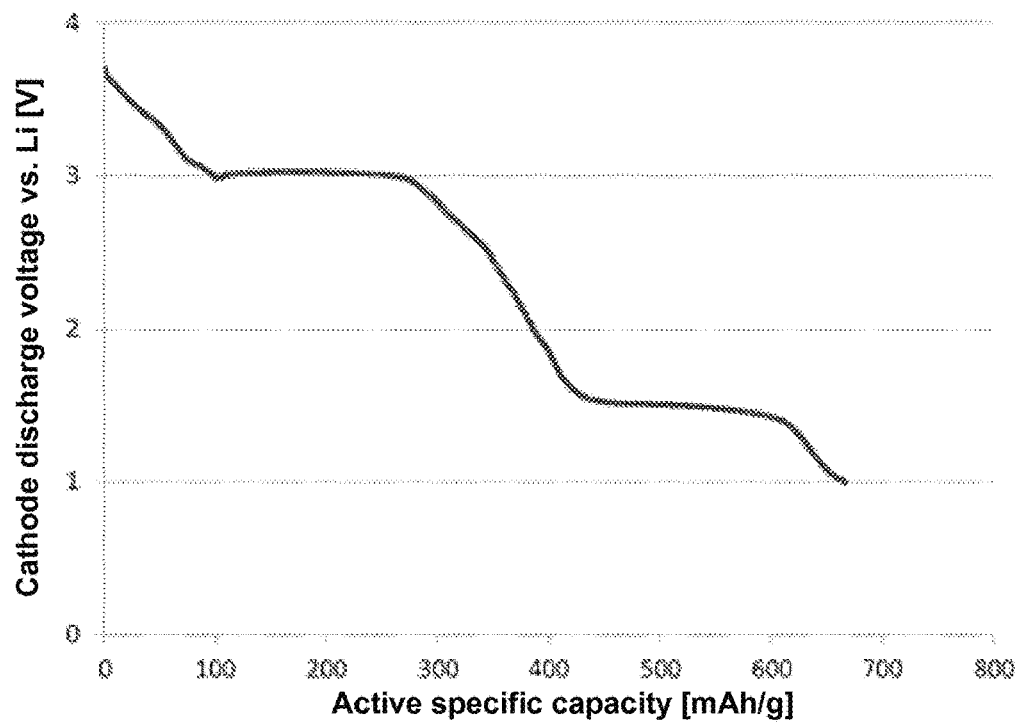
FIG. 22 shows a multi-plateau charge-discharge curve for an exemplary primary energy pack.

In certain embodiments, the charge algorithm or other battery management control algorithm is implemented to operate the batteries of the primary energy pack in a sulfide discharge region when the battery is to operate in a "reserve" mode. Reserve mode is implemented when the cells of the primary energy pack are in the lower voltage region of a multi-plateau discharge curve such as the one shown in FIG. 22. The vehicle may have lower performance in this region and the system algorithms such as those in the BMS are designed to account for this by making appropriately limited demands on the primary energy pack.

Staging the Cells of an Energy Pack

In another aspect, the batteries of the primary energy pack are divided into various stages or portions, each comprising a group of batteries or stacks. An algorithm for heating and/or charging and/or discharging these various batteries in the individual stages is implemented. In certain embodiments, the algorithm delivers heat to one or more stages while one or more other stages discharge or charge at peak performance. In some implementations, each stage is capable of powering the vehicle by itself In such designs, a cold start may proceed as follows: first the boost pack powers the vehicle and heats a first stage of the energy pack until the batteries of the first stage reach their operational temperature, then first stage takes over powering the vehicle while it and/or the boost pack heat a second stage of the energy pack until the batteries of that stage reach their operational temperature, the second stage then participates in powering the vehicle, and so on.

Each chain or stage of the pack must have its own set of connections for charging or discharging the vehicle. In some implementations, the individual stages may be connected in series. In some cases, a separate DC bus is provided to each chain.

In another aspect, a fuel is carried onboard the vehicle. The fuel may be burned to heat the battery pack prior-to and/or during cold-starts to warm the energy pack. The energy can be delivered to the entire energy pack immediately or delivered to stages sequentially.

External Fast Chargers

Various charging mechanisms may be employed. As described with reference to FIG. 1, a fast charge and slow charge may be employed. In certain embodiments, the slow charge may simply be a conventional 110 or 220 V outlet or other voltage supply provided in normal residential or commercial establishments.

The fast charger may provide significantly higher voltages and/or currents in order to very rapidly charge the primary energy pack. In certain embodiments, the fast charger is physically embodied with an in situ conditioning apparatus as described above. In such embodiments, the apparatus will be configured to operate differently during fast charge for normal end use and for in situ conditioning. Different energy, voltage, and/or current control algorithms are encoded for the two operations. In some cases, to promote safety and ease of use, the fast charge mechanism is provided via a coupling mechanism for engaging with the underside of the vehicle. An auto registration mechanism may be employed for final alignment between the external charger and the charging terminals for the primary energy pack.

The high power electricity delivered by the fast charger requires some safety considerations. This is one reason the charge mechanism is designed to engage with the underside of the vehicle. As an example of the charging process, the vehicle initially drives over the location of the fast charger, then a panel opens and a connection comes out, The connection is registered with appropriate charge terminals on the underside of the vehicle, and then charging occurs. In some implementations, all charging happens underneath the vehicle. In certain embodiments, the fast charger aligns with both the terminals of the primary energy pack and a heat exchange system/reservoir.

In certain embodiments, a fluid coupling is sized to handle up to 100 psi, 200 LPM, heat exchange fluid at low temperatures for cooling (e.g., about 10° C.) and high temperatures for heating (e.g., between about 80-100° C.) to a fast charge temperature. The high voltage electrical connection may be rated from about 400 to 1,000 V with a current capability of about 300-1,000 A.

What is claimed is:

1. A battery comprising:
   a boost pack and a primary energy pack;
   (a) wherein the primary energy pack comprises a plurality of unit cells arranged as one or more rechargeable battery stacks, each unit cell comprising:
      (i) a positive electrode layer;
      (ii) a lithium metal negative electrode layer;
      (iii) a solid-state electrolyte layer positioned between the positive electrode layer and the negative electrode layer;
      (iv) a positive current collector layer in electrical contact with the positive electrode layer; and
      (v) a negative current collector layer in electrical contact with the negative electrode layer;
   wherein the boost pack has a capacity of about 1-20 kWh and wherein the primary energy pack has a capacity of about 50-150 kWh;
   wherein the boost pack has a power capability of about 60-200 kW peak and about 30-80 kW continuous, and wherein the primary energy pack has a power capability of about 60-300 kW peak and about 30-100 kW continuous;
   (b) one or more compressible structures configured to apply pressure to the battery stacks during expansion of the one or more battery stacks during charge; and
   (c) a confinement structure about the one or more stacks and the one or more compressible structures.

2. The battery of claim 1, wherein the one or more compressible structures, taken together, accommodate at least about 10% volumetric expansion in the one or more battery stacks during charge.

3. The battery of claim 1, wherein the one or more compressible structures comprise a single compressible structure positioned proximate the one or more battery stacks, and wherein the confinement structure is a battery can.

4. The battery of claim 1, wherein the one or more compressible structures are positioned between at least two of the battery stacks, and wherein the confinement structure is a battery can.

5. The battery of claim 1, wherein the one or more compressible structures are positioned between adjacent unit cells of the stack.

6. The battery of claim 5, wherein the one or more compressible structures are positioned between layers of positive current collectors and/or between layers of negative current collectors of adjacent unit cells of the stack.

7. The battery of claim 1, wherein at least one of the positive or negative current collector layers is also one of the compressible structures.

8. The battery of claim 7, wherein the compressible structure that is one of the positive or negative current collector layers is selected from the group consisting of a carbon nanofoam, an aerogel, and non-woven carbon fiber.

9. The battery of claim 1, wherein the one or more rechargeable battery stacks and the one or more compressible structures have a compressible/cell ratio between about 0.001-2.

10. The battery of claim 1, wherein the positive electrodes comprise $FeF_3$.

11. The battery of claim 1, wherein the one or more compressible structures comprise a compressible material having a low compression set, wherein the resilience properties of the compressible structures are stable at temperatures between about 60-100° C.

12. The battery of claim 1, wherein at least one of the compressible structures is provided in the form of a block.

13. The battery of claim 1, wherein at least one of the compressible structures comprises at least one plate and at least one compressible member.

14. The battery of claim 13, wherein the plate is rigid.

15. The battery of claim 13, wherein the plate is flexible.

16. The battery of claim 13, wherein the plate includes a mechanism for maintaining the at least one compressible member in position.

17. A battery pack comprising:
   a boost pack and a primary energy pack;
   (a) wherein the primary energy pack comprises one or more battery stacks, each sealed in flexible pouches, wherein each of the one or more battery stacks comprise one or more unit cells, each comprising:
      (i) a positive electrode layer,
      (ii) a lithium metal negative electrode layer,
      (iii) an electrolyte layer positioned between the positive electrode layer and the negative electrode layer,
      (iv) a positive current collector layer in electrical contact with the positive electrode layer, and
      (v) a negative current collector layer in electrical contact with the negative electrode layer;
   wherein the boost pack has a capacity of about 1-20 kWh and wherein the primary energy pack has a capacity of about 50-150 kWh;

wherein the boost pack has a power capability of about 60-200 kW peak and about 30-80 kW continuous, and wherein the primary energy pack has a power capability of about 60-300 kW peak and about 30-100 kW continuous; and (b) one or more compression structures positioned such that the one or more compression structures compress as the one or more battery stacks expand on charge, and such that the one or more compression structures expand as one or more battery stacks decrease in volume on discharge.

18. A process for detecting an idle state charge, the process comprising:

providing a vehicle having a battery with a boost pack and a primary energy pack, (a) wherein the primary energy pack comprises a plurality of unit cells arranged as one or more rechargeable battery stacks, each unit cell comprising:
 (i) a positive electrode layer;
 (ii) a lithium metal negative electrode layer;
 (iii) a solid-state electrolyte layer positioned between the positive electrode layer and the negative electrode layer;
 (iv) a positive current collector layer in electrical contact with the positive electrode layer; and
 (v) a negative current collector layer in electrical contact with the negative electrode layer;
(b) one or more compressible structures configured to apply pressure to the battery stacks during expansion of the one or more battery stacks during charge; and
(c) a confinement structure about the one or more stacks and the one or more compressible structures,
wherein the boost pack has a capacity of about 1-20 kWh and wherein the primary energy pack has a capacity of about 50-150 kWh;
wherein the boost pack has a power capability of about 60-200 kW peak and about 30-80 kW continuous, and wherein the primary energy pack has a power capability of about 60-300 kW peak and about 30-100 kW continuous;

detecting if the vehicle is in an off state or an on state;
detecting if the boost pack is below a threshold value;
charging the boost pack if the boost pack is below a threshold value; and
charging the primary energy pack with either the boost pack or an external charger, if an external charger is present.

19. The process of claim 18, further comprising heating the primary energy pack by discharging the boost pack.

20. The battery of claim 1, wherein the boost pack comprises a plurality of second unit cells arranged as one or more second rechargeable battery stacks, each second unit cell comprising:
 (i) a second positive electrode layer;
 (ii) a second negative electrode layer;
 (iii) a liquid electrolyte or a second solid-state electrolyte layer positioned between the positive electrode layer and the negative electrode layer;
 (iv) a second positive current collector layer in electrical contact with the second positive electrode layer; and
 (v) a second negative current collector layer in electrical contact with the second negative electrode layer.

21. The battery of claim 17, wherein the boost pack comprises a plurality of second unit cells arranged as one or more second rechargeable battery stacks, each second unit cell comprising:
 (i) a second positive electrode layer;
 (ii) a second negative electrode layer;
 (iii) a liquid electrolyte or a second solid-state electrolyte layer positioned between the positive electrode layer and the negative electrode layer;
 (iv) a second positive current collector layer in electrical contact with the second positive electrode layer; and
 (v) a second negative current collector layer in electrical contact with the second negative electrode layer.

* * * * *